(12) United States Patent
Tsuchiya

(10) Patent No.: US 11,698,611 B2
(45) Date of Patent: Jul. 11, 2023

(54) SERVER AND POWER MANAGEMENT SYSTEM

(71) Applicant: Toyota Jidosha Kabushiki Kaisha, Toyota (JP)

(72) Inventor: Yoshiyuki Tsuchiya, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 17/115,009

(22) Filed: Dec. 8, 2020

(65) Prior Publication Data

US 2021/0170902 A1 Jun. 10, 2021

(30) Foreign Application Priority Data

Dec. 10, 2019 (JP) .................................. 2019-223034

(51) Int. Cl.
*G05B 15/02* (2006.01)
*B60L 53/67* (2019.01)
(Continued)

(52) U.S. Cl.
CPC .............. *G05B 15/02* (2013.01); *B60L 53/50* (2019.02); *B60L 53/62* (2019.02); *B60L 53/66* (2019.02);
(Continued)

(58) Field of Classification Search
CPC .......... B60L 53/67; B60L 53/50; B60L 53/62; B60L 53/66; B60L 53/68; B60L 58/12; B60L 2240/72; B60L 2260/52; B60L 53/14; B60L 53/22; B60L 58/10; G05B 15/02; H02J 13/00002; H02J 7/0048;
(Continued)

(56) References Cited

U.S. PATENT DOCUMENTS 10,110,029 B2 10/2018 Toya
10,819,135 B2 10/2020 Ambroziak et al.
(Continued)

FOREIGN PATENT DOCUMENTS

JP 2010-098793 A 4/2010
JP 2012-048286 A 3/2012
(Continued)

OTHER PUBLICATIONS

Office Action dated Mar. 24, 2022 issued in U.S. Appl. No. 17/110,975, filed Dec. 3, 2020.
(Continued)

*Primary Examiner* — Santosh R Poudel
(74) *Attorney, Agent, or Firm* — Dinsmore & Shohl LLP

(57) ABSTRACT

A power management system includes a plurality of power storages and a server. The server includes a selector that selects at least one of the plurality of power storages, a scheduler that makes a schedule for the selected power storage, and a request processor that requests a user of the selected power storage to promote external charging, suppress external charging, or carry out external power feed in accordance with the made schedule. The server obtains power run-out information that indicates power run-out risk for each power storage and carries out at least one of selection of the power storage and making of the schedule in accordance with a type of a request based on the obtained power run-out information.

18 Claims, 12 Drawing Sheets

(51) Int. Cl.
  *B60L 53/50* (2019.01)
  *B60L 53/62* (2019.01)
  *H02J 13/00* (2006.01)
  *B60L 53/66* (2019.01)
(52) U.S. Cl.
  CPC ........ *B60L 53/67* (2019.02); *H02J 13/00002* (2020.01)
(58) Field of Classification Search
  CPC ..... Y02T 10/70; Y02T 10/7072; Y02T 10/72; Y02T 90/12; Y02T 90/14; Y02T 90/16; Y02T 90/167; Y04S 30/12
  See application file for complete search history.

(56) References Cited

U.S. PATENT DOCUMENTS

| | | | |
|---|---|---|---|
| 2009/0091291 A1* | 4/2009 | Woody | B60W 10/28 701/2 |
| 2010/0188043 A1 | 7/2010 | Kelty et al. | |
| 2013/0285608 A1 | 10/2013 | Jikihara | |
| 2013/0311258 A1* | 11/2013 | Srivastava | G06Q 30/0207 705/14.2 |
| 2014/0117933 A1 | 5/2014 | Nyu | |
| 2014/0229255 A1* | 8/2014 | Scofield | G06Q 30/0207 705/14.1 |
| 2015/0046222 A1 | 2/2015 | Ishii | |
| 2015/0306968 A1 | 10/2015 | Ohira et al. | |
| 2016/0047862 A1 | 2/2016 | Shimizu et al. | |
| 2018/0240141 A1* | 8/2018 | Uyeki | G06Q 30/0219 |
| 2018/0241229 A1 | 8/2018 | Kitaoka et al. | |
| 2018/0262016 A1* | 9/2018 | Baughman | H02J 9/005 |
| 2019/0092176 A1 | 3/2019 | Uyeki | |
| 2019/0315242 A1* | 10/2019 | Sponheimer | B60L 53/66 |
| 2020/0156495 A1 | 5/2020 | Lindup | |
| 2020/0395771 A1* | 12/2020 | Hiratsuka | H02J 7/0025 |
| 2021/0094437 A1* | 4/2021 | Tsubokura | H02J 7/0068 |
| 2022/0048399 A1* | 2/2022 | Nishita | H02J 7/00 |

FOREIGN PATENT DOCUMENTS

| | | | | |
|---|---|---|---|---|
| JP | 2012-139025 | A | 7/2012 | |
| JP | 2012249505 | A | 12/2012 | |
| JP | 2014-087236 | A | 5/2014 | |
| JP | 2014158375 | A | 8/2014 | |
| JP | 2015100203 | A | 5/2015 | |
| JP | 2015-216836 | A | 12/2015 | |
| JP | 2018-064413 | A | 4/2018 | |
| JP | 2018-137886 | A | 8/2018 | |
| WO | 2012-093638 | A1 | 7/2012 | |
| WO | WO-2016169515 | A1 * | 10/2016 | ............. B60L 50/50 |

OTHER PUBLICATIONS

Final Office Action dated Sep. 30, 2022 to U.S. Appl. No. 17/110,975, filed Dec. 3, 2020.

Advisory Action dated Dec. 12, 2022 to U.S. Appl. No. 17/110,975, filed Dec. 3, 2020.

Non Final Office Action issued to U.S. Appl. No. 17/110,975, dated Mar. 30, 2023.

* cited by examiner

SERVER AND POWER MANAGEMENT SYSTEM

CROSS REFERENCE TO RELATED APPLICATIONS

This nonprovisional application claims priority to Japanese Patent Application No. 2019-223034 filed with the Japan Patent Office on Dec. 10, 2019, the entire contents of which are hereby incorporated by reference.

BACKGROUND

Field

The present disclosure relates to a server and a power management system, and more specifically to a technique for regulation of supply and demand of electric power by using a power storage.

Description of the Background Art

A technique for regulation of supply and demand of electric power by using a mobile body such as an electric vehicle has been known. For example, Japanese Patent Laying-Open No. 2018-137886 discloses a power management system that sequentially selects a vehicle shorter in available time period (that is, a time period available for regulation of supply and demand of electric power) in selecting a vehicle to which a request for regulation of supply and demand of electric power is to be issued. The available time period corresponds to a time period from current time until charging start time (see paragraph [0031] of Japanese Patent Laying-Open No. 2018-137886). The available time period is calculated, for example, by subtracting a time period required for charging a power storage mounted on a vehicle to set a state of charge (SOC) thereof from a current value to a target value, from a time period from current time until scheduled travel start time.

SUMMARY

In the power management system described in Japanese Patent Laying-Open No. 2018-137886, a mobile body (more specifically, a vehicle) is selected based on the available time period. In selecting a mobile body, power run-out risk of the mobile body is not taken into consideration. Therefore, in the power management system described in Japanese Patent Laying-Open No. 2018-137886, power run-out risk of the mobile body may be raised by regulation of supply and demand of electric power, which may compromise convenience of a user of the mobile body. The power run-out risk means a probability of occurrence of running out of electric power. Power run-out of a mobile body means that the mobile body is unable to travel due to decrease in electric power stored in a power storage of the mobile body.

The present disclosure was made to solve the problem above, and an object thereof is to provide a server and a power management system capable of suppressing excessively high power run-out risk of a power storage (and compromise of convenience of a user of the power storage) caused by regulation of supply and demand of electric power in requesting a user of the power storage to regulate supply and demand of electric power.

A server according to a first point of view of the present disclosure is usable in a power management system including a plurality of power storages. Each of the plurality of power storages carries out at least one of external charging and external power feed. External charging is charging of the power storage with electric power supplied from the outside. External power feed is supply of electric power from the power storage to the outside. The server includes a selector, a scheduler, and a request processor. The selector selects at least one of the plurality of power storages. The scheduler makes a schedule for the selected power storage. The request processor requests a user of the selected power storage to promote external charging, suppress external charging, or carry out external power feed in accordance with the made schedule. The server obtains power run-out information that indicates power run-out risk for each power storage and carries out at least one of selection of the power storage and making of the schedule in accordance with a type of a request (that is, any of promotion of external charging, suppression of external charging, and external power feed) based on the obtained power run-out information.

The request processor of the server can request the user of the power storage to regulate supply and demand of electric power. The request processor may transmit a signal to a communication apparatus registered in the server in association with the user of the power storage. The user of each of the plurality of power storages can contribute to regulation of supply and demand of electric power by controlling at least one of external charging and external power feed by the power storage in accordance with the request from the request processor or by permitting remote control of the power storage by the server during a period indicated in the schedule.

The server carries out at least one of selection of the power storage and making of the schedule based on power run-out information. For example, for a request that will raise power run-out risk, in selection of a power storage, the server may make the power storage higher in power run-out risk less likely to be selected. The server may suppress increase in power run-out risk by adjusting time to start the request in making the schedule for the power storage high in power run-out risk. The server can thus adjust power run-out risk of each power storage based on at least one of selection of the power storage and making of the schedule. Therefore, in requesting the user of the power storage to regulate supply and demand of electric power, the server can suppress excessively high power run-out risk of the power storage due to regulation of supply and demand of electric power (and compromise of convenience of the user of the power storage).

When the selector selects a power storage requested to suppress external charging or carry out external power feed by the request processor, the selector may preferentially sequentially select the power storage lower in power run-out risk.

As the power storage carries out external charging, an SOC of the power storage increases and hence power run-out risk of the power storage is lowered. The SOC represents a remaining amount of stored power, and it is expressed, for example, as a ratio of a current amount of stored power to an amount of stored power in a fully charged state that ranges from 0 to 100%. When the power storage is requested to suppress external charging, lowering in power run-out risk of the power storage by external charging is restricted. Therefore, it becomes difficult for the power storage requested to suppress external charging to prevent power run-out risk from becoming excessively high. In this connection, according to the server, in selection by the selector of a power storage requested to suppress external charging, the selector preferentially sequentially selects a power storage lower in power run-out risk and hence excessively high power run-out risk of the power storage is suppressed.

As the power storage carries out external power feed, the SOC of the power storage is lowered and hence power run-out risk of the power storage becomes higher. Therefore, the power storage requested to carry out external power feed tends to excessively be high in power run-out risk. In this connection, according to the server, in selection by the selector of a power storage requested to carry out external power feed, the selector preferentially sequentially selects a power storage lower in power run-out risk and hence excessively high power run-out risk of the power storage is suppressed.

When the scheduler makes a schedule for issuing a request for suppressing external charging or carrying out external power feed, the scheduler may make the schedule such that a power storage lower in power run-out risk among the selected power storages starts earlier the request for suppressing external charging or carrying out external power feed.

In the server, in making the schedule for issuing a request for suppressing external charging, the schedule is made such that the request for suppressing external charging is started earlier in a power storage lower in power run-out risk. Therefore, a power storage high in power run-out risk can be lowered in power run-out risk by the time of start of the request. Excessively high power run-out risk of the power storage is thus suppressed.

In the server, in making the schedule for issuing a request for carrying out external power feed, the schedule is made such that the request for carrying out external power feed is started earlier in a power storage lower in power run-out risk. Therefore, a power storage high in power run-out risk can be lowered in power run-out risk by the time of start of the request. Excessively high power run-out risk of the power storage is thus suppressed.

When the selector selects a power storage requested to promote external charging by the request processor, the selector may preferentially sequentially select the power storage higher in power run-out risk.

In the server, in selection by the selector of a power storage requested to promote external charging, the selector preferentially sequentially selects a power storage higher in power run-out risk. Therefore, the power storage high in power run-out risk can be lowered in power run-out risk by carrying out external charging. Excessively high power run-out risk of the power storage is thus suppressed.

When the scheduler makes a schedule for issuing a request for promoting external charging, the scheduler may make the schedule such that a power storage higher in power run-out risk among the selected power storages starts earlier the request for promoting external charging.

In the server, in making the schedule for issuing a request for promoting external charging, the schedule is made such that the request for promoting external charging is started earlier in a power storage higher in power run-out risk. Therefore, by carrying out external charging early based on the request, the power storage high in power run-out risk can be lowered in power run-out risk early. Excessively high power run-out risk of the power storage is thus suppressed.

The plurality of power storages may be mounted on a plurality of mobile bodies, respectively. Any server described above may include a first estimator that estimates the power run-out risk for each mobile body based on at least one of long-distance travel capability, charging capability, a current position, a next travel distance, next departure time, a next travel route, and remaining energy for traveling for each mobile body.

With the first estimator, power run-out risk of the mobile body can more readily and appropriately be estimated.

A power management system according to a second point of view of the present disclosure includes any server described above and a plurality of mobile bodies. The plurality of power storages described previously are mounted on the plurality of mobile bodies, respectively. Each of the plurality of mobile bodies in the power management system includes a second estimator that estimates the power run-out risk of each of the plurality of mobile bodies based on at least one of long-distance travel capability, charging capability, a current position, a next travel distance, next departure time, a next travel route, and remaining energy for traveling of the mobile body. Each of the plurality of mobile bodies transmits the power run-out risk of the mobile body estimated by the second estimator to the server.

With the second estimator, power run-out risk of the mobile body can more readily and appropriately be estimated.

A mobile body lower in long-distance travel capability is higher in power run-out risk. Long-distance travel capability can broadly be categorized into a travelable distance in a full energy state and a rate of energy consumption (for example, electric power consumption or fuel efficiency) by traveling.

A mobile body longer in travelable distance in the full energy state is higher in long-distance travel capability. The full energy state means a state that the mobile body holds energy for traveling up to its limit. In general, a plug-in hybrid vehicle (PHV) that can travel with both of electricity and fuel is longer in travelable distance in the full energy state and higher in long-distance travel capability than an electric vehicle (EV) that travels only with electricity. As the power storage deteriorates, an amount of electricity stored in the power storage decreases. As the power storage included in the mobile body deteriorates, the travelable distance in the full energy state of the mobile body becomes shorter and hence long-distance travel capability of the mobile body becomes lower.

A mobile body lower in rate of energy consumption by traveling is higher in long-distance travel capability. In other words, a mobile body better in electric power consumption is higher in long-distance travel capability. The mobile body better in electric power consumption is smaller in amount of power consumption per unit travel distance. As the power storage deteriorates, an internal resistance of the power storage tends to increase. As the internal resistance of the power storage included in the mobile body increases, Joule loss increases and hence electric power consumption of the mobile body becomes poor. As the mobile body is heavier, energy required for traveling is higher and hence the rate of energy consumption by travel is higher.

As a mobile body is lower in charging capability, power run-out risk thereof becomes higher. For example, a mobile body including a charger adapted to both of alternating-current (AC) charging and direct-current (DC) charging is higher in charging capability than a mobile body including a charger adapted only to AC charging. A mobile body higher in charging power output from the charger to the power storage is higher in charging capability. As charging power is higher, a time period required for charging is shorter and power run-out risk is lower.

Power run-out risk of a mobile body may be varied also depending on a current position of the mobile body (and an environment around the mobile body). For example, when there are fewer charging facilities available for a mobile body in an area around the mobile body, power run-out risk is higher. When a charging facility available for a mobile body is provided in a house of a user of the mobile body, power run-out risk of the mobile body is lower while the mobile body is located in or around the house.

As a next travel distance is longer, power run-out risk is higher. As next departure time is earlier, power run-out risk is higher. The server may predict the next departure time for each mobile body based on history data of each mobile body. The server may obtain the next departure time (that is, a user's schedule) from the user of the mobile body. The user can transmit the next departure time to the server through any communication equipment (for example, a portable terminal).

As there are more slopes on a next travel route, power run-out risk is higher. When a mobile body flies, power run-out risk is higher in an air passage where it receives head wind. A user can set a next travel route, for example, with a well-known navigation system. The user can transmit the next travel route to the server with any communication equipment (for example, communication equipment mounted on the mobile body).

A mobile body less in remaining energy for traveling is higher in power run-out risk. Remaining energy for traveling refers to energy for traveling held in the mobile body. For example, in a case of an EV, remaining energy for traveling refers to an amount of stored power in a power storage, and in a case of a PHV, it refers to an amount of fuel in a fuel tank and an amount of stored power in a power storage.

As the first estimator is mounted on the server, the server can estimate power run-out risk for each mobile body based on information (that is, information indicating at least one of long-distance travel capability, charging capability, a current position, a next travel distance, next departure time, a next travel route, and remaining energy for traveling) received from each mobile body. The server can use the information received from each mobile body also for another purpose. For example, the server may carry out at least one of selection of a mobile body and making of a schedule described previously based on information received from each mobile body.

As the second estimator is mounted on each mobile body, each mobile body can estimate power run-out risk thereof based on the information (that is, information indicating at least one of long-distance travel capability, charging capability, a current position, a next travel distance, next departure time, a next travel route, and remaining energy for traveling) on the mobile body. Each mobile body can use the estimated power run-out risk also for another purpose. For example, when estimated power run-out risk exceeds a prescribed level, each mobile body may notify a user that power run-out risk is high.

Information (for example, power run-out risk) held by each mobile body may be sent from each mobile body directly to the server or from each mobile body to the server via another apparatus.

A server according to a third point of view of the present disclosure is usable in a power management system including a plurality of power storages. Each of the plurality of power storages carries out at least one of external charging and external power feed. External charging is charging of the power storage with electric power supplied from the outside. External power feed is supply of electric power from the power storage to the outside. The plurality of power storages are mounted on a plurality of mobile bodies, respectively.

The server includes a selector, a scheduler, and a request processor. The selector selects at least one of the plurality of power storages. The scheduler makes a schedule for the selected power storage. The request processor requests a user of the selected power storage to promote external charging, suppress external charging, or carry out external power feed in accordance with the made schedule. The server obtains information on at least one of long-distance travel capability, charging capability, a current position, a next travel distance, next departure time, a next travel route, and remaining energy for traveling for each mobile body and carries out at least one of selection of the power storage and making of the schedule in accordance with a type of a request (that is, any of promotion of external charging, suppression of external charging, and external power feed) based on the obtained information.

According to the server, in requesting the user of the power storage to regulate supply and demand of electric power, compromise of convenience of the user of the power storage due to regulation of supply and demand of electric power can be suppressed.

A power management system according to a fourth point of view of the present disclosure includes any server described above and a plurality of vehicles. The plurality of power storages described previously are mounted on the plurality of vehicles, respectively. The power management system further includes a plurality of power facilities electrically connectable to the plurality of vehicles, respectively, and a power grid that supplies electric power to each of the plurality of power facilities. The request processor transmits a signal that requests a user of the vehicle to promote external charging, suppress external charging, or carry out external power feed in accordance with the schedule, to at least one of communication equipment mounted on the vehicle and a portable terminal carried by the user of the vehicle.

According to the configuration, as the server transmits the signal to the vehicle (more specifically, communication equipment) and/or the portable terminal, balance of supply and demand of the power grid can be regulated.

The signal from the server to the vehicle or the portable terminal may directly be transmitted from the server to the vehicle or the portable terminal or from the server to the vehicle or the portable terminal via another apparatus (for example, the power facility).

The mobile body may be an electrically powered vehicle. The electrically powered vehicle refers to a vehicle that travels with electric power stored in a power storage mounted on the vehicle. The mobile body may remotely be controllable or may be self-driving. The mobile body may be a flying object (for example, a drone).

The foregoing and other objects, features, aspects and advantages of the present disclosure will become more apparent from the following detailed description of the present disclosure when taken in conjunction with the accompanying drawings.

DETAILED DESCRIPTION

Figure 1:
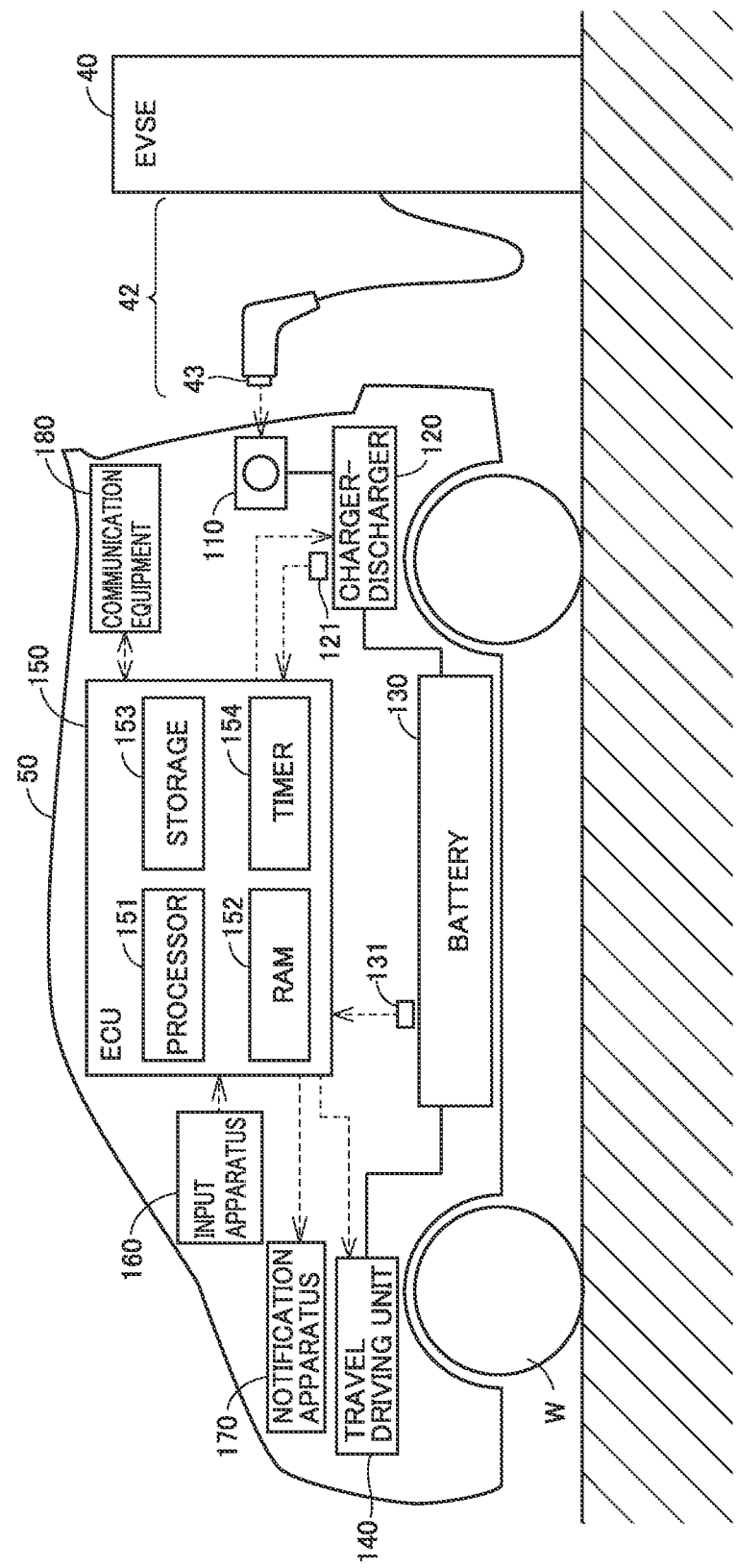
FIG. 1 is a diagram showing a configuration common to vehicles included in a power management system according to an embodiment of the present disclosure.

An embodiment of the present disclosure will be described below in detail with reference to the drawings. The same or corresponding elements in the drawings have the same reference characters allotted and description thereof will not be repeated.

A power management system according to this embodiment includes a plurality of vehicles and a plurality of pieces of EVSE. EVSE means electric vehicle supply equipment. In this embodiment, the power management system includes an EV (that is, an electric vehicle that can travel with electric power stored in a powder storage) and a PHV (that is, a plug-in hybrid vehicle that can travel with both of electric power stored in a power storage and engine output). The power management system includes AC type EVSE (that is, a normal charger) and DC type EVSE (for example, a quick charger). Each of the plurality of vehicles included in the power management system is denoted as a "vehicle 50" below and each of the plurality of pieces of EVSE included in the power management system is denoted as "EVSE 40" below, unless they are described as being distinguished from one another.

FIG. 1 is a diagram showing a configuration common among vehicles 50 included in the power management system according to this embodiment. Referring to FIG. 1, vehicle 50 includes a battery 130 that stores electric power for traveling. Battery 130 includes a secondary battery such as a lithium ion battery or a nickel metal hydride battery. In this embodiment, a battery assembly including a plurality of lithium ion batteries is adopted as the secondary battery. The battery assembly is composed of a plurality of cells electrically connected to one another. Instead of the secondary battery, another power storage such as an electric double layer capacitor may be adopted. Battery 130 according to this embodiment corresponds to an exemplary "power storage" according to the present disclosure.

Vehicle 50 includes an electronic control unit (which is referred to as an "ECU" below) 150. ECU 150 carries out charging control and discharging control of battery 130. ECU 150 controls communication with the outside of vehicle 50. Vehicle 50 further includes a monitoring module 131 that monitors a state of battery 130. Monitoring module 131 includes various sensors that detect a state (for example, a voltage, a current, and a temperature) of battery 130 and outputs a result of detection to ECU 150. ECU 150 can obtain a state (for example, a temperature, a current, a voltage, an SOC, and an internal resistance) of battery 130 based on an output (that is, detection values from various sensors) from monitoring module 131. Though vehicle 50 is driven by a user in this embodiment, vehicle 50 may be self-driving.

Vehicle 50 includes an inlet 110 and a charger-discharger 120 adapted to AC type EVSE. EVSE 40 shown in FIG. 1 is AC type EVSE. Inlet 110 receives electric power supplied from the outside of vehicle 50. Inlet 110 outputs electric power supplied from charger-discharger 120 to the outside of vehicle 50. Vehicle 50 may include an inlet and a charger-discharger (neither of which is shown) adapted to DC type EVSE in addition to inlet 110 and charger-discharger 120.

A charging cable 42 is connected to EVSE 40. Charging cable 42 may always be connected to EVSE 40 or may be attachable to and removable from EVSE 40. Charging cable 42 includes a connector 43 at its tip end and contains a power line. Connector 43 of charging cable 42 can be connected to inlet 110. As connector 43 of charging cable 42 connected to EVSE 40 is connected to inlet 110 of vehicle 50, EVSE 49 and vehicle 50 are electrically connected to each other. Electric power can thus be supplied from EVSE 40 through charging cable 42 to vehicle 50.

Charger-discharger 120 is located between inlet 110 and battery 130. Charger-discharger 120 includes a relay that switches between connection and disconnection of an electric power path from inlet 110 to battery 130 and a power conversion circuit (neither of which is shown). For example, a bidirectional converter can be adopted as the power conversion circuit. Each of the relay and the power conversion circuit included in charger-discharger 120 is controlled by ECU 150. Vehicle 50 further includes a monitoring module 121 that monitors a state of charger-discharger 120. Monitoring module 121 includes various sensors that detect a state (for example, a voltage, a current, and a temperature) of charger-discharger 120 and outputs a result of detection to ECU 150. In this embodiment, monitoring module 121 detects a voltage and a current input to and output from the power conversion circuit.

As EVSE 40 outside vehicle 50 and inlet 110 are connected to each other through charging cable 42, electric power can be supplied and received between EVSE 40 and vehicle 50. Therefore, external charging by vehicle 50 can be carried out (that is, electric power can be supplied from the outside of vehicle 50 to charge battery 130 of vehicle 50). Electric power for external charging is supplied, for example, from EVSE 40 through charging cable 42 to inlet 110. Charger-discharger 120 converts AC power received at inlet 110 into DC power suitable for charging of battery 130 and outputs DC power to battery 130. As EVSE 40 and inlet 110 are connected to each other through charging cable 42, external power feed by vehicle 50 (that is, power feed from vehicle 50 through charging cable 42 to EVSE 40) can be carried out. Electric power for external power feed is supplied from battery 130 to charger-discharger 120. Charger-discharger 120 converts DC power supplied from battery 130 into AC power suitable for external power feed and outputs AC power to inlet 110. When any of external charging and external power feed is performed, the relay of charger-discharger 120 is closed (connected), and when neither of external charging and external power feed is performed, the relay of charger-discharger 120 is opened (disconnected).

The configuration of charger-discharger 120 is not limited as above and can be modified as appropriate. Charger-discharger 120 may include, for example, at least one of a rectification circuit, a power factor correction (PFC) circuit, an insulating circuit (for example, an insulating transformer), an inverter, and a filter circuit. When vehicle 50 carries out external power feed to AC type EVSE, charger-discharger 120 may subject electric power discharged from battery 130 to DC/AC conversion and resultant AC power may be supplied from vehicle 50 to the EVSE. When vehicle 50 carries out external power feed to DC type EVSE, vehicle 50 may supply DC power to the EVSE and an inverter contained in the EVSE may carry out DC/AC conversion. Standards of the DC type EVSE may be any of CHAdeMO, Combined Charging System (CCS), GB/T, and Tesla.

ECU 150 includes a processor 151, a random access memory (RAM) 152, a storage 153, and a timer 154. For example, a central processing unit (CPU) can be adopted as processor 151. RAM 152 functions as a work memory that temporarily stores data to be processed by processor 151. Storage 153 can store information that is put thereinto. Storage 153 includes, for example, a read only memory (ROM) and a rewritable nonvolatile memory. Storage 153 stores not only a program but also information (for example, a map, a mathematical expression, and various parameters) to be used by a program. As a program stored in storage 153 is executed by processor 151, various types of control by ECU 150 are carried out in this embodiment. Various types of control by ECU 150 are not limited to control carried out by software but can also be carried out by dedicated hardware (electronic circuitry). Any number of processors may be provided in ECU 150 and a processor may be prepared for each prescribed type of control.

Timer 154 notifies processor 151 that the set time has come. As the time set in timer 154 comes, timer 154 transmits a signal to that effect to processor 151. In this embodiment, a timer circuit is adopted as timer 154. Timer 154 may be implemented by software instead of hardware (timer circuitry). ECU 150 can obtain current time from a real time clock (RTC) circuit (not shown) contained in ECU 150.

Vehicle 50 further includes a travel driving unit 140, an input apparatus 160, a notification apparatus 170, communication equipment 180, and a drive wheel W. Vehicle 50 is not limited to a front-wheel-drive vehicle shown in FIG. 1 and it may be a rear-wheel-drive vehicle of a four-wheel-drive vehicle.

Travel driving unit 140 includes a not-shown power control unit (PCU) and a motor generator (MG), and allows vehicle 50 to travel with electric power stored in battery 130. The PCU includes, for example, a controller including a processor, an inverter, a converter, and a relay (none of which is shown). The relay included in the PCU is referred to as a "system main relay (SMR)" below. The controller of the PCU receives an instruction (a control signal) from ECU 150 and controls the inverter, the converter, and the SMR of the PCU in accordance with the instruction. The MG is implemented, for example, by a three-phase AC motor generator. The MG is driven by the PCU and rotates drive wheel W. The MG performs regeneration and supplies regenerated electric power to battery 130. The SMR switches between connection and disconnection of an electric power path from battery 130 to the PCU. The SMR is closed (connected) when vehicle 50 travels.

Travel driving unit 140 of the PHV further includes an engine (an internal combustion engine), a fuel tank, and a fuel pump (none of which is shown). The fuel tank is provided with a fuel sensor (not shown) that detects a remaining amount of fuel and outputs the amount to ECU 150. Fuel (for example, gasoline) in the fuel tank is supplied to the engine by the fuel pump and converted to motive power in the engine. Motive power output from the engine rotates drive wheel W. The PHV may include a generator that generates electric power with motive power output from the engine. The MG described previously may generate electric power with motive power output from the engine. Electric power generated by the engine may be stored in battery 130 or used for traveling of the PHV.

Input apparatus 160 accepts an input from a user. Input apparatus 160 is operated by a user and outputs a signal corresponding to the operation by the user to ECU 150. Communication may be wired or wireless. Examples of input apparatus 160 include various switches, various pointing devices, a keyboard, and a touch panel. An operation portion of a car navigation system may be adopted as input apparatus 160. A smart speaker that accepts audio input may be adopted as input apparatus 160.

Notification apparatus 170 performs prescribed processing for giving a notification to a user (for example, a driver and/or a passenger of vehicle 50) when a request is given from ECU 150. Notification apparatus 170 may include at least one of a display apparatus (for example, a touch panel display), a speaker (for example, a smart speaker), and a lamp (for example, a malfunction indicator lamp (MIL)). Notification apparatus 170 may be implemented by a meter panel, a head-up display, or a car navigation system.

Communication equipment 180 includes various communication interfaces (I/F). Communication equipment 180 may include a data communication module (DCM). ECU 150 wirelessly communicates with a communication apparatus outside vehicle 50 through communication equipment 180.

Though not shown, vehicle 50 includes various sensors (for example, a position sensor, an outside air temperature sensor, a vehicle speed sensor, and an odometer) that detect a state of vehicle 50 in real time. The state of vehicle 50 is successively detected and recorded in storage 153 of ECU 150. The position sensor may be a sensor based on the global positioning system (GPS). The position sensor may be contained in a car navigation system (not shown) mounted on vehicle 50.

An electric power system dependent on a large-scale power plant (an intensive energy resource) possessed by an electric power utility company has recently been reviewed and a scheme for utilizing an energy resource possessed by each demand side (which is also referred to as "demand side resources (DSR)" below) in the electric power system has been constructed. The DSR functions as distributed energy resources (which are also referred to as "DER" below).

A virtual power plant (VPP) has been proposed as a scheme for utilizing the DSR for an electric power system. The VPP refers to a scheme in which a large number of DER (for example, DSR) are put together according to a sophisticated energy management technology that makes use of the Internet of Things (IoT) and the DER are remotely controlled as being integrated as if the DER functioned as a single power plant. In the VPP, an electric utility that puts the DER together to provide an energy management service is referred to as an "aggregator." An electric power utility company, for example, in coordination with an aggregator, can balance between supply and demand of electric power based on demand response (which is also referred to as "DR" below).

DR is an approach to balancing between supply and demand of electric power by issuing a prescribed request to each demand side by using a demand response signal (which is also referred to as a "DR signal" below). The DR signal is broadly categorized into two types of a DR signal that requests suppression of power demand or backfeeding (which is also referred to as a "DR suppression signal" below) and a DR signal that requests increase in power demand (which is also referred to as a "DR increase signal" below).

A vehicle grid integration (VGI) system is adopted as the power management system according to this embodiment. In the VGI system, an electrically powered vehicle (that is, vehicle 50 described above) including a power storage is adopted as DSR for realizing VPP.

Figure 2:
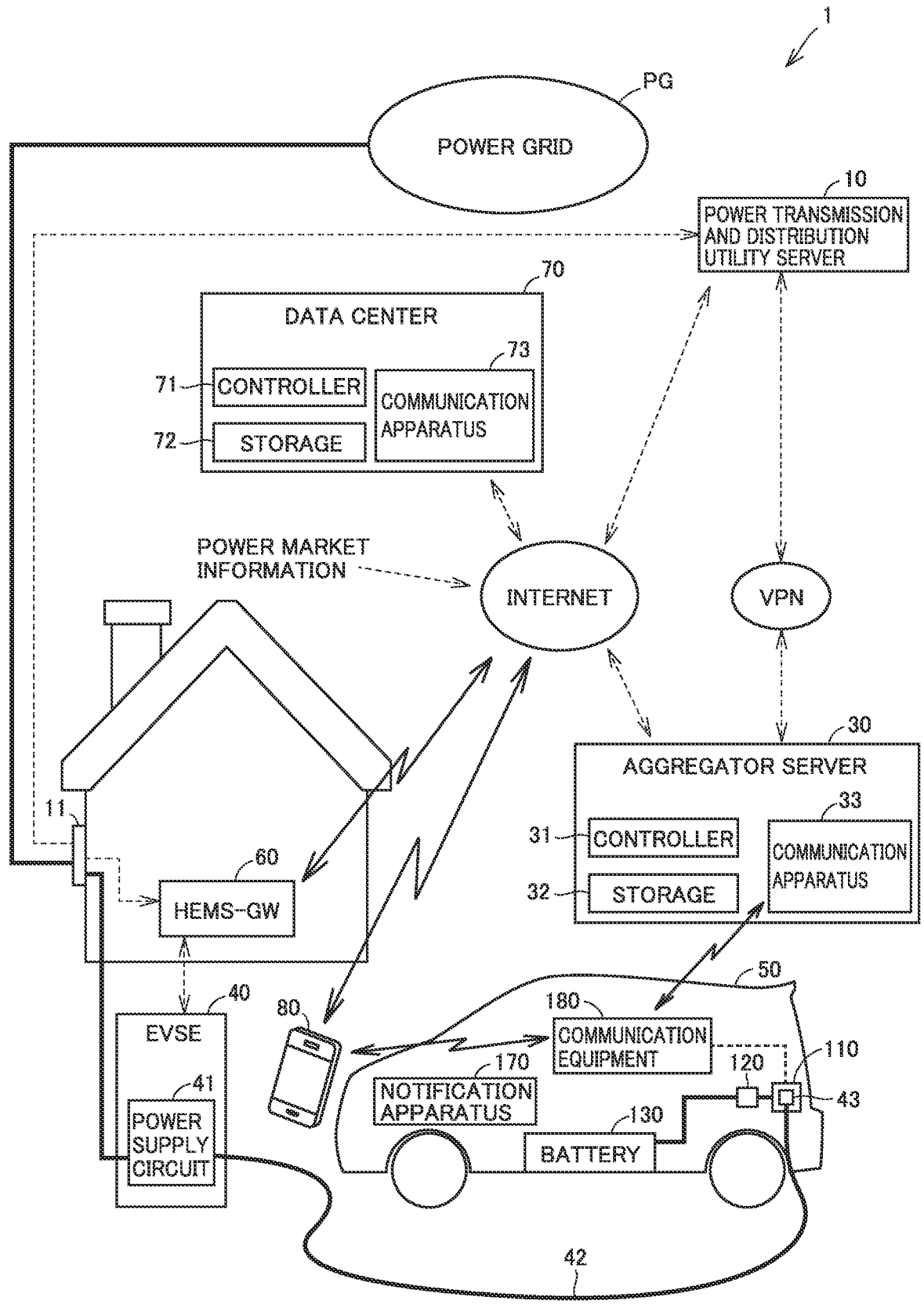
FIG. 2 is a diagram showing a schematic configuration of a power management system according to the embodiment of the present disclosure.

FIG. 2 is a diagram showing a schematic configuration of the power management system according to this embodiment. A VGI system 1 shown in FIG. 2 corresponds to an exemplary "power management system" according to the present disclosure. Though FIG. 2 shows only one of each of the vehicle, the EVSE, and an aggregator server, VGI system 1 includes a plurality of vehicles, a plurality of pieces of EVSE, and a plurality of aggregator servers. Any independent number of vehicles, pieces of EVSE, and aggregator servers may be included in VGI system 1, and the number may be set to ten or more or one hundred or more. Each vehicle included in VGI system 1 may be a personally owned vehicle (POV) or a MaaS (mobility as a service) vehicle. The MaaS vehicle refers to a vehicle managed by a MaaS entity. Though FIG. 2 shows only a single portable terminal, the portable terminal is carried by each user of the vehicle. Though FIG. 2 illustrates home EVSE, VGI system 1 may include public EVSE that can be used by a large number of unspecified users.

Referring to FIG. 2, VGI system 1 includes a power transmission and distribution utility server 10 (which is also simply referred to as a "server 10" below), a smart meter 11, an aggregator server 30 (winch is also simply referred to as a "server 30" below), EVSE 40, vehicle 50 (see FIG. 1), a home energy management system-gateway (HEMS-GW) 60, a datacenter 70, a portable terminal 80, and a power grid PG. In this embodiment, a smartphone equipped with a touch panel display is adopted as portable terminal 80. Without being limited thereto, any portable terminal can be adopted as portable terminal 80, and a tablet terminal, a wearable device (for example, a smart watch), an electronic key, or a service tool can also be adopted.

Server 10 belongs to a power transmission and distribution utility. In this embodiment, an electric power utility company serves also as a power generation utility and a power transmission and distribution utility. The electric power utility company constructs a power network (that is, power grid PG) with a power plant and a power transmission and distribution facility which are not shown, and maintains and manages server 10, smart meter 11, EVSE 40, HEMS-GW 60, and power grid PG. Power grid PG according to this embodiment corresponds to an exemplary "power grid" according to the present disclosure. In this embodiment, the electric power utility company corresponds to a system operator that operates power grid PG.

The electric power utility company can make a profit, for example, by dealing with a demand side (for example, an individual or a company) that uses electric power. The electric power utility company provides each demand side with a smart meter. For example, a user of vehicle 50 shown in FIG. 2 is provided with smart meter 11. A meter ID (identification information for identification of each smart meter) is provided for each smart meter, and server 10 manages a value of measurement by each smart meter as being distinguished based on the meter ID. The electric power utility company can know an amount of power usage for each demand side based on a value of measurement by each smart meter.

In VGI system 1, an ID (identification information) for identification among a plurality of aggregators is provided for each aggregator. Server 10 manages information for each aggregator as being distinguished based on the ID of the aggregator. The aggregator provides an energy management service by putting together amounts of electric power controlled by demand sides under the control thereof. The aggregator can control the amount of electric power by requesting each demand side to level electric power by using a DR signal.

Server 30 belongs to an aggregator. Server 30 includes a controller 31, a storage 32, and a communication apparatus 33. Controller 31 includes a processor, performs prescribed information processing, and controls communication apparatus 33. Details of the configuration of server 30 will be described later. In VGI system 1, an electrically powered vehicle (for example, a POV or a MaaS vehicle) is adopted as DSR managed by the aggregator (and server 30). A demand side can control an amount of electric power by means of the electrically powered vehicle. The aggregator may procure capacity (capability of supply of electricity) not only from vehicle 50 but also from a resource other than vehicle 50 (for example, a vending machine, a plant factory, or biomass). The aggregator can make a profit, for example, by dealing with an electric power utility company. The aggregator may be divided into an upper aggregator that contacts a power transmission and distribution utility (for example, the electric power utility company) and a lower aggregator that contacts a demand side.

Data center 70 includes a controller 71, a storage 72, and a communication apparatus 73. Controller 71 includes a processor, performs prescribed information processing, and controls communication apparatus 73. Storage 72 can store various types of information. Communication apparatus 73 includes various types of communication I/Fs. Controller 71 communicates with the outside through communication apparatus 73. Data center 70 manages information on a plurality of registered portable terminals (including portable terminals 80). Information on the portable terminal includes not only information on the terminal itself but also information on a user who carries the portable terminal. Examples of the information on the terminal itself include a communication address of the portable terminal. Examples of the information on the user include a vehicle ID of vehicle 50 belonging to the user A terminal ID (identification information for identification of the portable terminal) is provided for each portable terminal and data center 70 manages information for each portable terminal as being distinguished based on the terminal ID. The terminal ID also functions as a user ID (information for identification of a user).

Prescribed application software (which is simply referred to as an "application" below) is installed in portable terminal 80, and portable terminal 80 exchanges information with each of server 30, HEMS-GW 60 and data center 70 through the application. Portable terminal 80 wirelessly communicates with each of server 30, HEMS-GW 60 and data center 70, for example, through the Internet. A user can transmit information representing a state and a schedule of the user to data center 70 by operating portable terminal 80. A schedule set in a scheduler application or a wake-up application installed in portable terminal 80 may automatically be transmitted to data center 70. Exemplary information representing a state of the user includes information indicating whether or not the user is in a condition of being ready for addressing DR. Exemplary information representing the schedule of the user includes a drive plan of a POV (for example, time of departure from home, a destination, and arrival time) or a drive plan of a MaaS vehicle. Each of server 30 and data center 70 stores the information received from portable terminal 80 as being distinguished for each terminal ID.

Server 10 and server 30 can communicate with each other, for example, through a virtual private network (VPN). Each of servers 10 and 30 can obtain power market information (for example, information on trading of electric power), for example, through the Internet. A protocol of communication between server 10 and server 30 may be OpenADR. Server 30 and data center 70 can communicate with each other, for example, through the Internet. A protocol of communication between server 30 and data center 70 may be OpenADR. Server 30 can obtain information on a user from data center 70. Each of server 30 and data center 70 can communicate with HEMS-GW 60, for example, through the Internet. A protocol of communication between each of server 30 and data center 70 and HEMS-GW 60 may be OpenADR.

Though server 30 and EVSE 40 do not communicate with each other in this embodiment, server 30 and EVSE 40 may communicate with each other. Server 30 may communicate with vehicle 50 with EVSE 40 being interposed. EVSE 40 may communicate with an EVSE management cloud. A protocol of communication between EVSE 40 and the EVSE management cloud may be open charge point protocol (OCPP).

Server 30 sequentially obtains from each vehicle 50, information representing a state or a schedule of each vehicle 50 (for example, a position of the vehicle, an ON/OFF state of a start switch, a state of connection of the charging cable, a state of the battery, a charging schedule, a condition for charging, a power feed schedule, a condition for power feed, a schedule of travel, and a condition for travel) under the control thereof and stores the information. The start switch is a switch for starting a vehicle system, and generally referred to as a "power switch" or an "ignition switch." The state of connection of the charging cable is information on whether or not connector 43 of charging cable 42 is connected to inlet 110. The state of the battery is information on a value of an SOC of battery 130 and information indicating whether or not battery 130 is being charged. The charging schedule is information indicating time of start and end of scheduled external charging. The condition for charging may be a condition for scheduled external charging (for example, charging power) or a condition for external charging that is currently ongoing (for example, charging power and a remaining time period of charging). The power feed schedule is information indicating time of start and end of scheduled external power feed. The condition for power feed may be a condition for scheduled external power feed (for example, feed power) or a condition for external power feed that is currently ongoing (for example, feed power and a remaining time period for power feed). The schedule of travel is information indicating time of start and end of scheduled travel. The condition for travel may be a condition for scheduled travel (for example, a travel route and a travel distance) or a condition for travel that is currently ongoing (for example, a traveling speed and a remaining distance of travel).

Server 10 levels electric power by using demand response (DR). When server 10 levels electric power, initially, the server transmits a signal (which is also referred to as a "DR participation request" below) requesting participation into DR to each aggregator server (including server 30). The DR participation request includes a region of interest of DR, a type of DR (for example, DR suppression or DR increase), and a DR period. When server 30 receives a DR participation request from server 10, it calculates an adjustable DR amount (that is, an amount of electric power that can be adjusted in accordance with DR) and transmits the amount to server 10. Server 30 can calculate the adjustable DR amount, for example, based on a total of DR capacities of demand sides under the control thereof. The DR capacity refers to a capacity secured by a demand side for DR.

Server 10 determines a DR amount (that is, an amount of power regulation asked to an aggregator) for each aggregator based on the adjustable DR amount received from each aggregator server and transmits a signal (which is also referred to as a "DR execution instruction" below) instructing each aggregator server (including server 30) to execute DR. The DR execution instruction includes a region of interest of DR, a type of DR (for example, DR suppression or DR increase), a DR amount for the aggregator, and a DR period. When server 30 receives the DR execution instruction, it allocates the DR amount to each vehicle 50 that can address DR among vehicles 50 under the control thereof, generates a DR signal for each vehicle, and transmits the DR signal to each vehicle 50. The DR signal may be a price signal that urges a user of vehicle 50 to regulate supply and demand or a charging command or a power feed command for server 30 to directly control vehicle 50. The price signal may include a type of DR (for example, DR suppression or DR increase), a DR amount for vehicle 50, a DR period, and incentive information. The price signal may be transmitted to portable terminal 80 instead of or in addition to vehicle 50. When vehicle 50 permits remote control (for example, dispatching by server 30), server 30 can directly control vehicle 50 by transmitting a charging command or a power feed command to vehicle 50.

ECU 150 receives a DR signal through communication equipment 180 from the outside of the vehicle. When ECU 150 receives the DR signal, a user of vehicle 50 can contribute to regulation of supply and demand of electric power requested by an electric utility (for example, an electric power utility company or an aggregator) by carrying out external charging or external power feed in accordance with the DR signal by using EVSE 40 and vehicle 50. The electric utility can request the user of vehicle 50 to regulate supply and demand of electric power by transmitting the DR signal. The DR signal may be transmitted from server 30 to vehicle 50 in response to a DR execution instruction as described above. The DR signal may also be transmitted from server 30 to vehicle 50 based on power market information (see, for example, FIG. 7 which will be described later). In this embodiment, when the user of vehicle 50 has contributed to regulation of supply and demand of electric power requested by the electric utility, an incentive in accordance with contribution is paid to the user of vehicle 50 by the electric utility based or an agreement between the user of vehicle 50 and the electric utility.

An electric utility measures contribution with any method. The electric utility may find a contribution based on a measurement value from smart meter 11. VGI system 1 may include, in addition to smart meter 11, a wattmeter (for example, a not-shown smart meter) that measures a contribution. The electric utility may find a contribution based on a measurement value from a wattmeter (not shown) contained in EVSE 40. The electric utility may find a contribution based on a measurement value from a sensor (for example, monitoring module 121 or 131) mounted on vehicle 50. A portable charging cable may be provided with a metering function and the electric utility may find a contribution based on an amount of electric power measured by the charging cable. A user ID may be provided for each charging cable and the user ID may automatically be transmitted from the charging cable to a server (for example, server 10 or 30) of the electric utility when the user uses the charging cable. By doing so, the electric utility can identify which user has carried out charging and discharging.

Vehicle 50 shown in FIG. 2 is electrically connected to outdoor EVSE 40 through charging cable 42 while it is parked in a parking space of a residence (for example, a user's house). EVSE 40 is a non-public charging facility used only by a user and a family member of the user. In this embodiment, EVSE 40 is a charging facility adapted to backfeeding (that is, a charging and discharging facility). As connector 43 of charging cable 42 connected to EVSE 40 is connected to inlet 110 of vehicle 50, vehicle 50 and EVSE 40 can communicate with each other and electric power can be supplied and received between EVSE 40 and vehicle 50. Power supply circuit 41 included in EVSE 40 is electrically connected to power grid PG. For example, as electric power is supplied from power grid PG through power supply circuit 11 and charging cable 42 to vehicle 50, battery 130 is externally charged. As vehicle 50 carries out external power feed to EVSE 40, electric power can be back fed from vehicle 50 through charging cable 42 and power supply circuit 41 to power grid PG. Power supply circuit 11 converts electric power supplied from power grid PG into electric power suitable tor external charging and converts electric power supplied from vehicle 50 into electric power suitable for backfeeding.

Power supply circuit 41 is connected to power grid PG provided by the electric power utility company with smart meter 11 being interposed. Smart meter 11 measures an amount of electric power supplied from EVSE 40 to vehicle 50. Smart meter 11 may also measure an amount of electric power backfed from vehicle 50 to EVSE 40. Smart meter 11 measures an amount of power usage each time a prescribed time period elapses (for example, each time thirty minutes elapse), stores the measured amount of power usage, and transmits the measured amount of power usage to server 10 and HEMS-GW 60. For example, IEC (DLMS/COSEM) can be adopted as a protocol for communication between smart meter 11 and server 10. Server 10 transmits at any time, a value of measurement by smart meter 11 to server 30. Server 10 may transmit the measurement value regularly or upon request from server 30.

HEMS-GW 60 transmits information on energy management (for example, information representing a state of use of electric power) to each of server 30, data center 70, and portable terminal 80 HEMS-GW 60 receives a value of measurement of the amount of electric power from smart meter 11. Smart meter 11 and HEMS-GW 60 may communicate with each other in any type of communication, and the type of communication may be a 920-MHz-band low-power wireless communication or power line communication (PLC). HEMS-GW 60 and EVSE 40 can communicate with each other, for example, through a local area network (LAN). The LAN may be wired or wireless LAN. Standards of communication between HEMS-GW 60 and EVSE 40 may be any of ECHONET Lite, smart energy profile (SEP) 2.0, and KNX.

Communication equipment 180 mounted on vehicle 50 communicates with EVSE 40 through charging cable 42. Communication between EVSE 40 and vehicle 50 may be of any type, and for example, controller area network (CAN) or PLC may be adopted. Standards of communication between EVSE 40 and vehicle 50 may be ISO/IEC15118 or IEC61851.

Communication equipment 180 wirelessly communicates with server 30, for example, through a mobile communication network (telematics). A signal exchanged between vehicle 50 and server 30 may be encrypted by a scheme designated by an aggregator. In this embodiment, communication equipment 180 and portable terminal 80 wirelessly communicate with each other. ECU 150 (FIG. 1) can control portable terminal 80 through wireless communication to give a notification to a user. Communication equipment 180 and portable terminal 80 may communicate with each other through short-range communication such as Bluetooth® (for example, direct communication in a vehicle or within an area around the vehicle).

Figure 3:
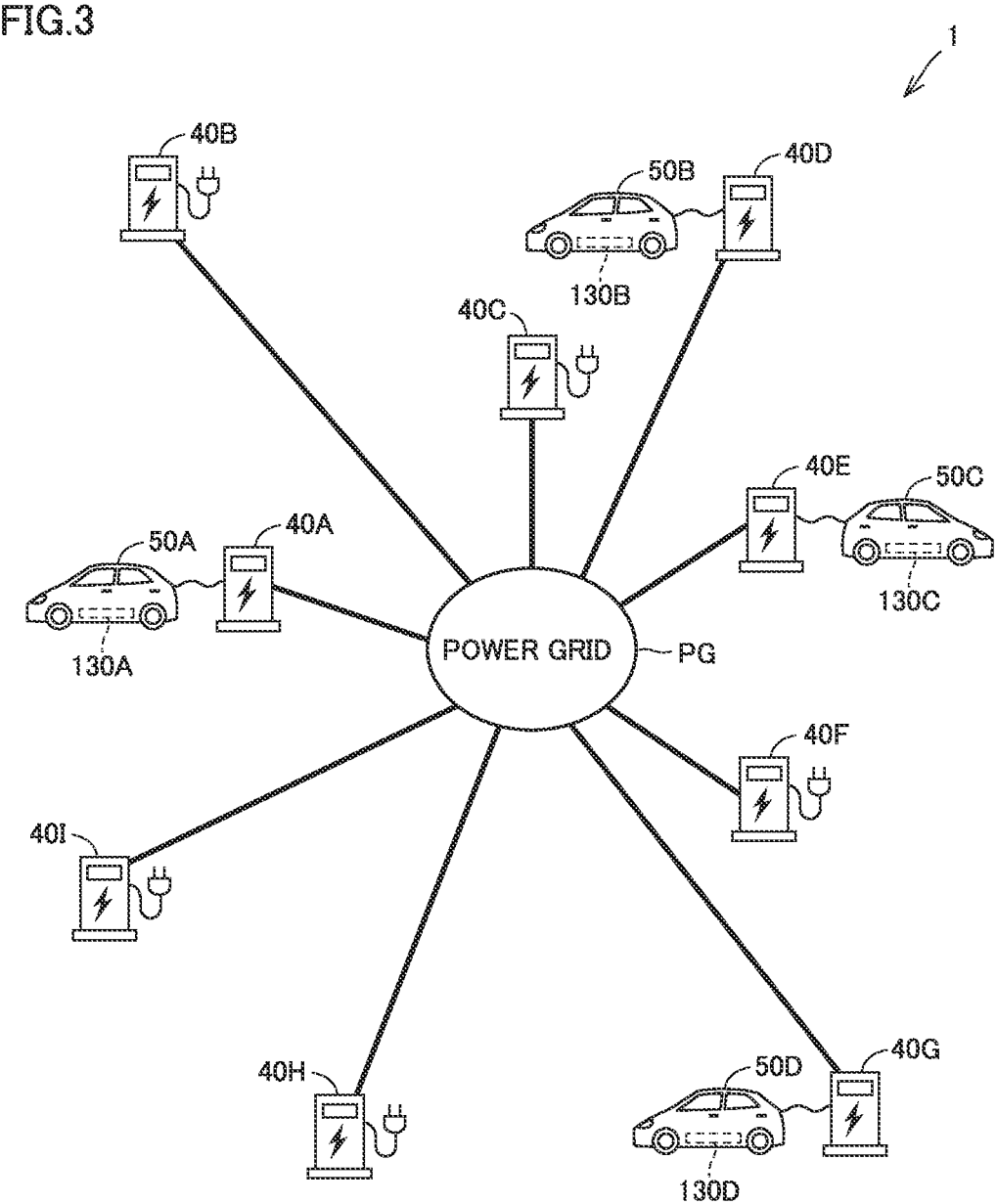
FIG. 3 is a diagram showing a power grid, a plurality of pieces of EVSE, and a plurality of vehicles included in the power management system according to the embodiment of the present disclosure.

FIG. 3 is a diagram showing a power grid, a plurality of pieces of EVSE, and a plurality of vehicles included in the power management system according to this embodiment. Referring to FIG. 3, VGI system 1 includes EVSE 40A to 40I, vehicles 50A to 50D, and power grid PG. Vehicles 50A to 50D include batteries 130A to 130D, respectively. Each of batteries 130A to 130D is capable of both of external charging and external power feed. In this embodiment, vehicle 50A is a PHV and each of vehicles 50B to 50D is an EV. Each of pieces of EVSE 40A to 40I corresponds to an exemplary "power facility" according to the present disclosure.

Power grid PG supplies electric power to each of pieces of EVSE 40A to 40I. Each of vehicles 50A to 50D can electrically be connected to power grid PG through any of pieces of EVSE 40A to 40I. In the example shown in FIG. 3, vehicles 50A, 50B, 50C, and 50D are electrically connected to power grid PG through EVSE 40A, 40D, 40E, and 40G, respectively. Power grid PG can supply electric power to vehicles 50A to 50D through EVSE 40A, 40D, 40E, and 40G, respectively.

In the power management system (VGI system 1) according to this embodiment, the user of vehicle 50 can contribute to regulation of supply and demand of electric power by meeting the request from server 30. As power run-out risk of vehicle 50 becomes higher due to regulation of supply and demand of electric power, however, convenience of the user of vehicle 50 may be compromised.

Figure 4:
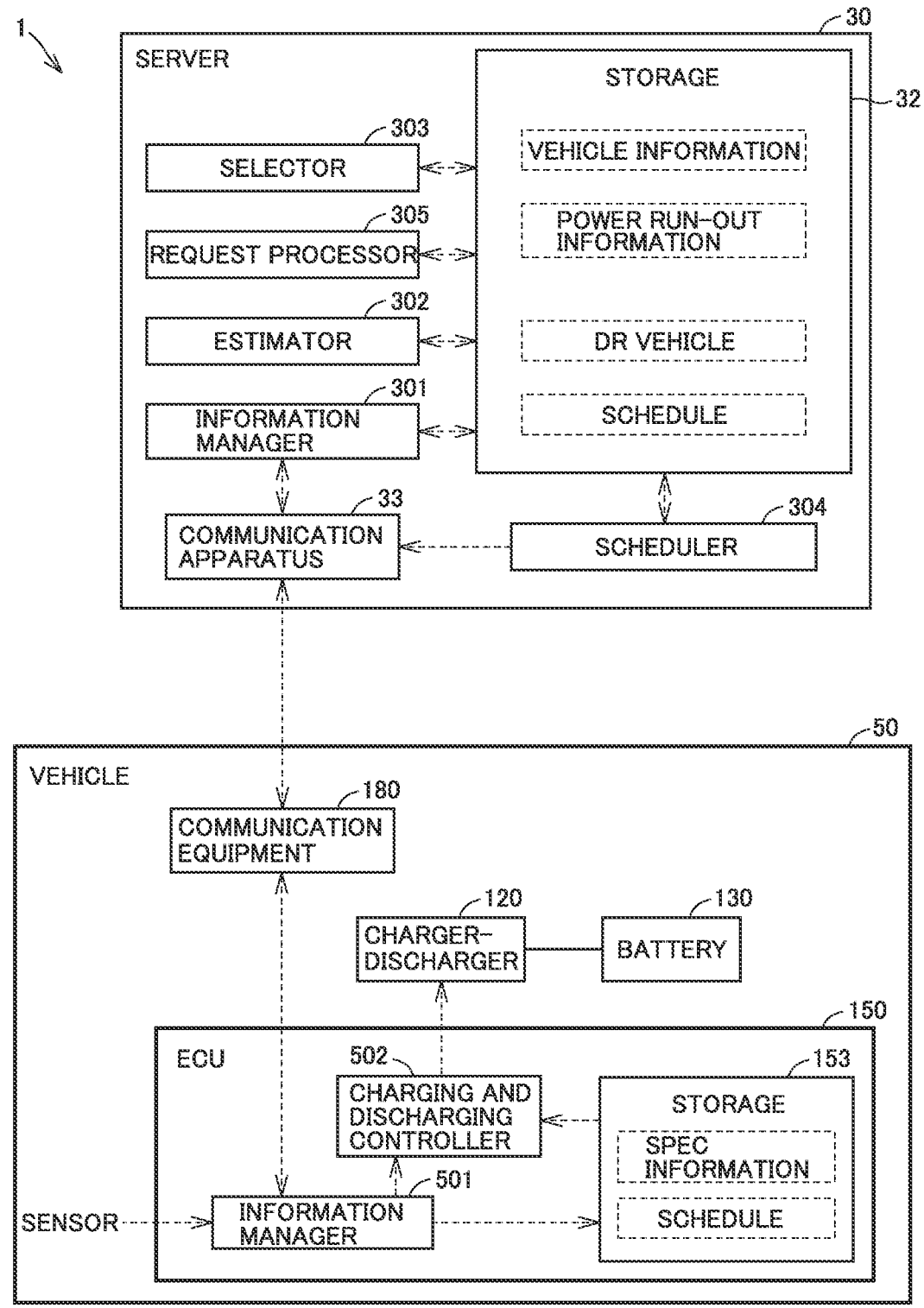
FIG. 4 is a diagram showing a detailed configuration of a vehicle controller and a server included in the power management system according to the embodiment of the present disclosure.

With a configuration which will be described below, the power management system (VGI system 1) according to this embodiment suppresses excessively high power run-out risk of vehicle 50 due to regulation of supply and demand of electric power (and compromise of convenience of the user of vehicle 50) when server 30 requests the user of vehicle 50 to regulate supply and demand of electric power. FIG. 4 is a diagram showing a detailed configuration of ECU 150 of vehicle 50 and server 30.

Referring to FIG. 4, server 30 can communicate with each of communication equipment 180 of vehicle 50 and portable terminal 80. Server 30 includes an information manager 301, an estimator 302, a selector 303, a scheduler 304, and a request processor 305. In server 30 according to this embodiment, each component above is implemented by the processor of controller 31 shown in FIG. 2 and a program executed by the processor. Without being limited as such, each component above may be implemented by dedicated hardware (electronic circuitry).

ECU 150 includes an information manager 501 and a charging and discharging controller 502. In ECU 150 according to this embodiment, each component above is implemented by processor 151 shown in FIG. 1 and a program executed by processor 151. Without being limited as such, each component above may be implemented by dedicated hardware (electronic circuitry).

Information manager 501 of ECU 150 successively transmits information representing a state or a schedule of vehicle 50 described previously to server 30. Information manager 501 can obtain the state of vehicle 50 based on outputs from various sensors mounted on vehicle 50. Storage 153 stores in advance information representing specifications (for example, travel capability and charging capability) of vehicle 50. Information representing the specifications of vehicle 50 is also referred to as "spec information" below. Information manager 501 transmits spec information to server 30 at the time of registration of vehicle 50 in server 30 or in response to a request from server 30. Information on vehicle 50 transmitted from vehicle 50 to server 30 is also referred to as "vehicle information" below. Information manager 301 of server 30 has storage 32 store vehicle information received from vehicle 50 in association with a vehicle ID of vehicle 50.

Estimator 302 of server 30 estimates power run-out risk for each vehicle based on long-distance travel capability, charging capability, a next travel distance, next departure time, and remaining energy for traveling (which is also simply referred to as "remaining energy" below) for each vehicle. Estimator 302 according to this embodiment corresponds to an exemplary "first estimator" according to the present disclosure. Estimation of power run-out risk of vehicle 50 by estimator 302 of server 30 will be described below with reference to FIGS. 5 and 6.

Figure 5:
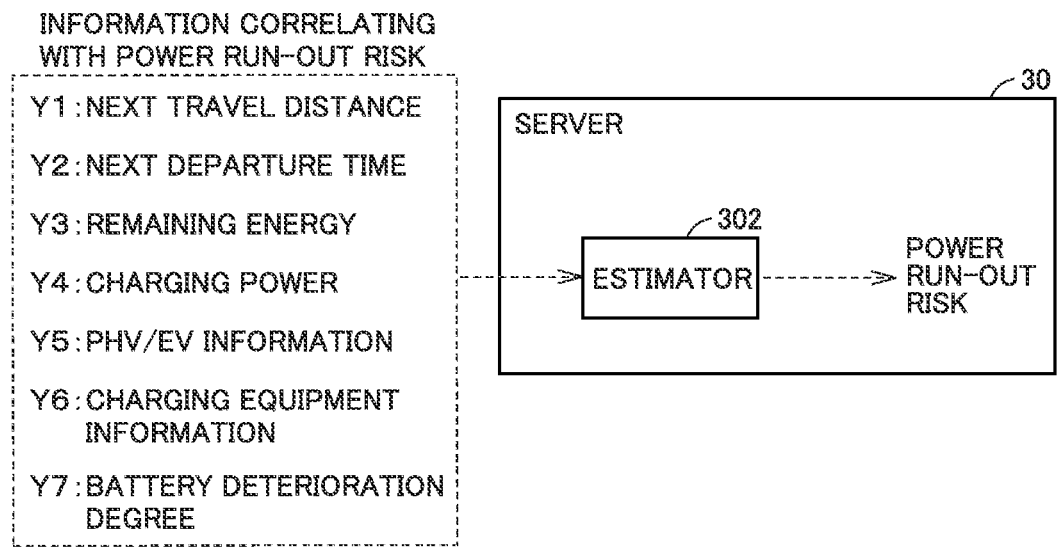
FIG. 5 is a diagram showing information used for estimating power run-out risk in the power management system according to the embodiment of the present disclosure.

FIG. 5 is a diagram showing information used for estimating power run-out risk. Referring to FIG. 5, estimator 302 estimates power run-out risk of vehicle 50 based on a next travel distance (which is also referred to as "Y1" below) of vehicle 50, next departure time (which is also referred to as "Y2" below) of vehicle 50, remaining energy (which is also referred to as "Y3" below) of vehicle 50, charging power (which is also referred to as "Y4" below) for battery 130, PHV/EV information (which is also referred to as "Y5" below), charging equipment information (which is also referred to as "Y6" below), and a degree of deterioration (which is also referred to as "Y7" below) of battery 130.

Y1 may represent a next travel distance obtained from a user or a next travel distance estimated by server 30. Server 30 can obtain Y1 based on information (for example, a drive plan of a PVO or a drive plan of a MaaS vehicle) received from a user. Server 30 can also estimate Y1 from vehicle information received from vehicle 50. Server 30 may estimate Y1 from a travel distance or a destination in the past (history data). Server 30 may predict a next travel distance based on learning with history data. Artificial intelligence (AI) may be used tor learning.

Y2 may represent next departure time obtained from a user or next departure time estimated by server 30. Server 30 can obtain Y2 based on information received from a user (for example, a drive plan of a PVO or a drive plan of a MaaS vehicle). Server 30 can also estimate Y2 from vehicle information received from vehicle 50. Server 30 may estimate Y2 from a charging location, arrival time, and departure time in the past (history data). Arrival time refers to lime when vehicle 50 arrives at a charging location. Departure time refers to time when vehicle 50 leaves a charging location. Server 30 may predict next departure lime based on learning with history data. Artificial intelligence (AI) may be used for learning.

Y3 represents an amount of energy resource held by vehicle 50 for driving drive wheel W by means of travel driving unit 140. In a case of an EV, an amount of stored power in battery 130 corresponds to Y3. An amount of stored power in battery 130 corresponds to an amount of electricity that can be supplied to an MG for travel driving. In a case of a PHV, a value of the sum of an amount of stored power in battery 130 and an amount of fuel in a fuel tank as being converted to travel driving energy corresponds to Y3.

Y4 represents charging power for battery 130 (that is, electric power output from charger-discharger 120 to battery 130 in charging of battery 130). When charging power for battery 130 is variable, maximum charging power corresponds to Y4. Y4 corresponds to exemplary "charging capability." Server 30 can receive Y4 from vehicle 50. In this embodiment, vehicle information (more specifically, spec information) includes Y4.

Y5 represents information on whether vehicle 50 falls under an EV or a PHV. A PHV is longer in travelable distance in the fully energy state than an EV. Therefore, the PHV is higher in long-distance travel capability than the EV. Y5 corresponds to exemplary "long-distance travel capability." Server 30 can receive Y5 from vehicle 50. In this embodiment, vehicle information (more specifically, spec information) includes Y5.

Vehicle 50 according to this embodiment includes inlet 110 and charger-discharger 120 adapted to AC type EVSE as standard equipment. An inlet and a charger-discharger adapted to DC type EVSE can be added to vehicle 50. The inlet and the charger-discharger adapted to DC type EVSE fall under optional charging equipment. Whether or not to mount optional charging equipment on vehicle 50 can be selected by a user of vehicle 50. Y6 represents information on whether or not optional charging equipment is mounted on vehicle 50. Vehicle 50 without optional charging equipment can carry out external charging only with AC type EVSE. Vehicle 50 incorporating optional charging equipment can carry out external charging with both of AC type EVSE and DC type EVSE. Y6 corresponds to exemplary "charging capability." Server 30 can receive Y6 from vehicle 50. In this embodiment, vehicle information (more specifically, spec information) includes Y6.

Y7 represents information on a degree of deterioration of battery 130. Y7 may represent a capacity retention of battery 130. The capacity retention of battery 130 is an expression in percentage of a ratio of a current capacity to an initial capacity. The initial capacity refers to a capacity of battery 130 in an initial state. The current capacity refers to a capacity of battery 130 at the current time point. The degree of deterioration of battery 130 is lower as the capacity retention of battery 130 is higher. Y7, however is not limited to represent the capacity retention of battery 130 but it may represent an internal resistance of battery 130. As the internal resistance of battery 130 is higher, the degree of deterioration of battery 130 is higher. Server 30 can estimate Y7 from vehicle information received from vehicle 50. Server 30 can estimate the degree of deterioration of battery 130 with a known method (for example, an AC impedance method, an AC internal resistance method, a direct charging and discharging measurement method, a discharge curve differentiation method, a charging curve analysis method, or an estimation method based on a charging and discharging history).

Figure 6:
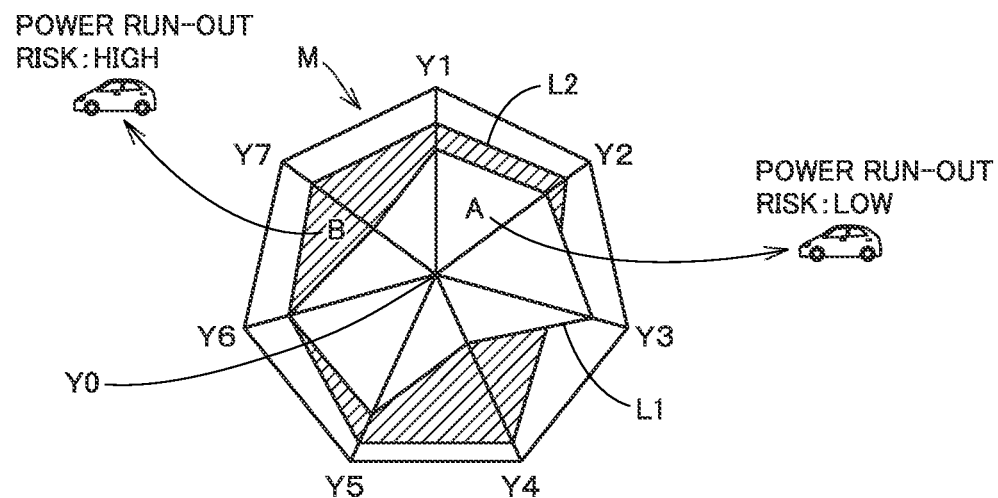
FIG. 6 is a radar chart used for estimating power run-out risk in the power management system accenting to the embodiment of the present disclosure.

FIG. 6 shows a radar chart used for estimating power run-out risk. Y1 to Y7 in FIG. 6 are the same as Y1 to Y7 shown in FIG. 5. Referring to FIG. 6, a radar chart M shows power run-out risk of vehicle 50A (FIG. 3) and power run-out risk of vehicle 50B (FIG. 3) in contrast with each other. A center Y0 indicates the origin of radar chart M. As a degree of increase in power run-out risk is higher, line data of items from Y1 to Y7 is plotted at a position more distant from center Y0 (on an outer side). More specifically, as the next travel distance (Y1) of vehicle 50 is longer, power run-out risk is higher. Therefore, the line data of Y1 is plotted on the further outer side as the next travel distance of vehicle 50 is longer. As next departure time (Y2) of vehicle 50 is earlier, power run-out risk is higher. Therefore, the line data of Y2 is plotted on the further outer side as next departure time of vehicle 50 is earlier. As remaining energy (Y3) of vehicle 50 is less, power run-out risk is higher. Therefore, the line data of Y3 is plotted on the further outer side as remaining energy of vehicle 50 is less. As charging power (Y4) for battery 130 is higher, time required for charging is shorter and power run-out risk is lower. Therefore, the line data of Y4 is plotted on the further outer side as charging power for battery 130 is lower. Since the PHV is longer than the EV in travelable distance in the full energy state, power run-out risk is lower. Therefore, the line data of PHV/EV information (Y5) is plotted on the further outer side for the EV as compared with the PHV. Vehicle 50 adapted to both of AC charging and DC charging is lower in power run-cut risk than vehicle 50 adapted only to AC charging. Therefore, the line data of charging equipment information (Y6) is plotted on the further outer side in the case "without optional charging equipment" as compared with the case "with optional charging equipment." As the degree of deterioration (Y7) of battery 130 is higher, long-distance travel capability of vehicle 50 is lower and power run-out risk is higher. Therefore, the line data of Y7 is plotted on the further outer side as the degree of deterioration of battery 130 is higher.

Lines L1 and L2 show power run-out risks of vehicles 50A and 50B, respectively. Areas on the inner side of lines L1 and L2 correspond to power run-out risks of vehicles 50A and 50B, respectively. As the area is larger, power run-out risk is higher. Radar chart M shows that vehicle 50B is higher in power run-out risk than vehicle 50A.

Any scale (and weight for each item) for Y1 to Y7 in radar chart M can be set by a user. The user may set the scale for Y1 to Y7 based on relation between power run-out risk and each of Y1 to Y7 obtained through experiments or simulation. A method of estimating power run-out risk is not limited to the method using the radar chart, and power run-out risk may be calculated based on Y1 to Y7 by using a mathematical expression obtained by statistical learning with big data (for example, an expression that expresses relation between Y1 to Y7 and power run-out risk).

Referring again to FIG. 4, estimator 302 of server 30 estimates power run-out risk for each vehicle 50 and has storage 32 store the estimated power run-out risk in association with a vehicle ID. Power run-out information representing power run-out risk of each vehicle 50 is thus stored in storage 32. Estimator 302 estimates power run-out risk and updates power run-out information at any time based on most recent vehicle information. Estimator 302 may have storage 32 store real-time power run-out risk of each vehicle 50 by highly frequently updating power run-out information.

Though details will be described later, when server 30 is requested to regulate supply and demand of electric power from the outside (for example, an electric power utility company or a power market), server 30 requests each vehicle 50 under the control thereof to regulate electric power in a procedure as shown below. Initially, selector 303 selects vehicles 50 in number necessary for meeting the request from the outside from among a plurality of vehicles 50 under the control thereof. Each vehicle 50 selected by selector 303 is also referred to as a "DR vehicle" below. Scheduler 304 makes a charging and discharging control schedule (which is simply referred to as a "schedule" below) for battery 130 of each DR vehicle. The schedule may be a charging schedule, a power feed schedule, or a charging suppression schedule. The charging suppression schedule refers to a schedule that shows a period for which charging is restricted (that is, time of start and end of restriction). Examples of charging restriction include prohibition of charging and restriction of charging power (that is, prohibition of charging with prescribed electric power or higher). Each of the DR vehicle selected by selector 303 and the schedule made by scheduler 304 is stored in storage 32 of server 30. Request processor 305 transmits a DR signal for requesting electric power regulation in accordance with the schedule made by scheduler 304 to the user of each DR vehicle. The DR signal requests the user of the DR vehicle to control at least one of external charging and external power feed in accordance with the schedule. The DR signal may be transmitted to communication equipment 180 mounted on the DR vehicle or to portable terminal 80 carried by the user of the DR vehicle. Each of communication equipment 180 and portable terminal 80 corresponds to the communication apparatus registered in server 30 in association with the user of vehicle 50.

When information manager 501 receives the DR signal from server 30, the DR signal is stored in storage 153. The user of vehicle 50 can receive an incentive from an aggregator by controlling at least one of external charging and external power feed in accordance with the DR signal or permitting remote control of vehicle 50 by server 30 during a period indicated in the schedule.

Charging and discharging controller 502 carries out charging and discharging control of battery 130 by controlling charger-discharger 120. Though remote control of charging and discharging controller 502 is prohibited in principle, it can remotely be controlled by server 30 during a DR period indicated in the schedule included in the DR signal within storage 153. The DR period corresponds to a period from DR start time until DR end time. While charging and discharging controller 502 is remotely controllable, server 30 can directly control charging and discharging controller 502 by transmitting a charging command or a power feed command to vehicle 50. Information manager 501 may suppress unauthorized remote control (for example, remote control by a component other than server 30) by performing prescribed authentication of a received command and excluding the unauthorized command. Permission and prohibition of remote control of charging and discharging controller 502 may be set by a user of vehicle 50 through input apparatus 160 or portable terminal 80.

Figure 7:
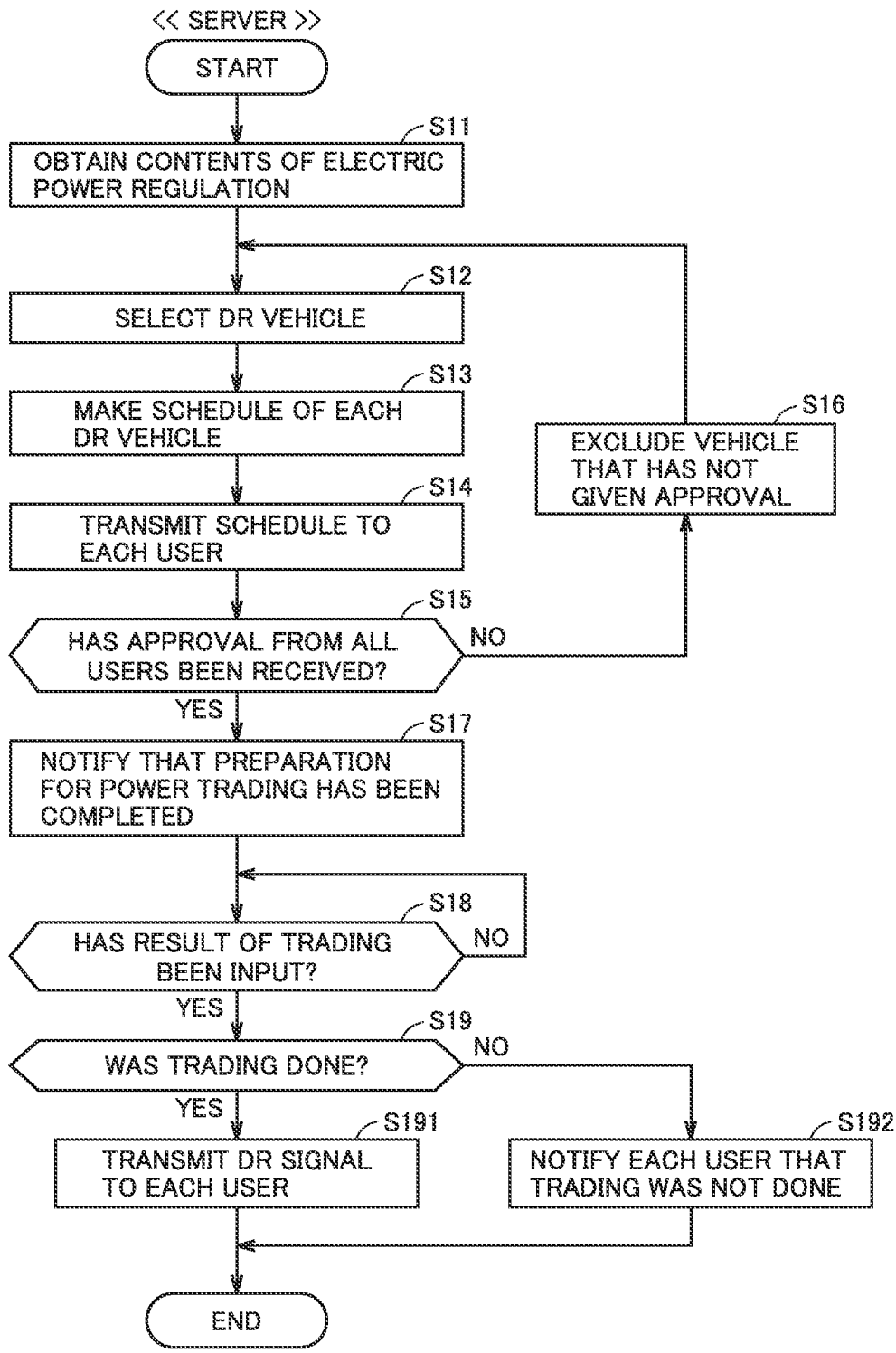
FIG. 7 is a flowchart showing processing performed by a server when an aggregator trades electric power in a power market in the power management system according to the embodiment of the present disclosure.

FIG. 7 is a flowchart showing processing performed by server 30 when an aggregator trades electric power in a power market. Processing shown in this flowchart is started in response to input by the aggregator of contents of electric power regulation requested in the power market to server 30 when regulation of supply and demand of power grid PG is requested in the power market. Contents of electric power regulation input to server 30 are also referred to as "request contents" below. Referring to FIG. 7 together with FIGS. 1 to 4, in a step (which is simply denoted as "S" below) 11, controller 31 of server 30 obtains request contents (that is, contents of electric power regulation) input by the aggregator. The request contents include a type of electric power regulation (for example, promotion of external charging, suppression of external charging, or external power feed), an amount of electric power regulation, and a request period.

In S12, selector 303 of server 30 selects a DR vehicle to which a request for electric power regulation is to be issued, from among vehicles 50 under the control thereof.

Figure 8:
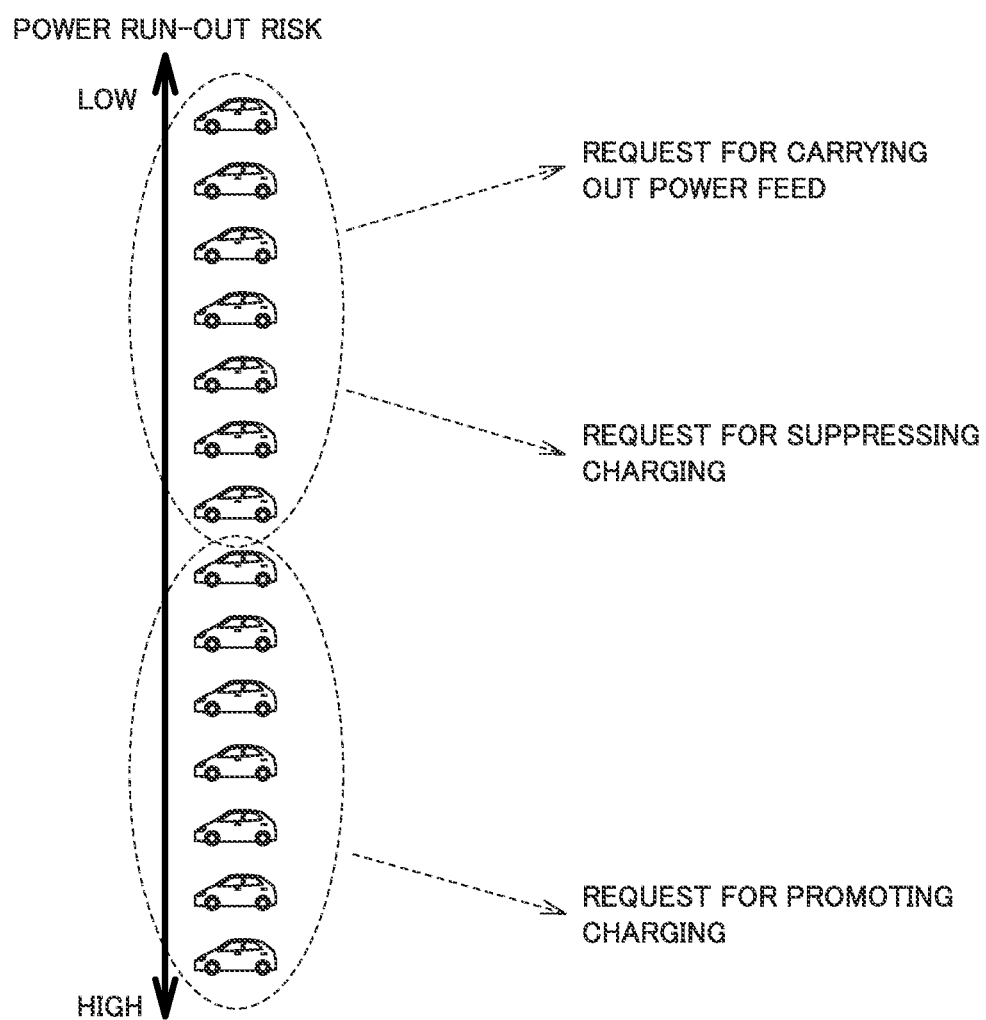
FIG. 8 is a diagram for illustrating selection of a DR vehicle made in the processing shown in FIG. 7.

Selector 303 selects a DR vehicle based on the request contents obtained in S11 and power run-out information (FIG. 4) in storage 32. Selector 303 selects a prescribed number (more specifically, a number necessary for meeting the request contents) of DR vehicles from among candidates for the DR vehicle. FIG. 8 is a diagram for illustrating selection of a DR vehicle.

Referring to FIG. 8, in this embodiment, a type of electric power regulation indicated in the request contents falls under any of suppression of external charging, execution of external power feed, and promotion of external charging.

When vehicle 50 is requested to suppress external charging, lowering in power run-out risk thereof by external charging is restricted, and it becomes difficult for the vehicle to prevent power run-out risk from becoming excessively high. Then, when the type of requested electric power regulation falls under suppression of external charging, selector 303 preferentially sequentially selects vehicle 50 lower in power run-out risk. Excessively high power run-out risk of vehicle 50 is thus suppressed.

As vehicle 50 carries out external power feed, the SOC of battery 130 is lowered and power run-out risk of vehicle 50 becomes higher. When the type of requested electric power regulation falls under execution of external power feed, selector 303 then preferentially sequentially selects vehicle 50 lower in power run-out risk Excessively high power run-out risk of vehicle 50 is thus suppressed.

When the type of requested electric power regulation falls under promotion of external charging, selector 303 preferentially sequentially selects vehicle 50 higher in power run-out risk. Therefore, vehicle 50 high in power run-out risk can be lowered in power run-out risk by carrying out external charging. Excessively high power run-out risk of vehicle 50 is thus suppressed.

When there are a large number of vehicles 50 equal in power run-out risk and a prescribed number of DR vehicles cannot be selected only based on the power run-out risk, selector 303 may narrow down candidates for the DR vehicle based on the power run-out risk and thereafter select the DR vehicles based on an arbitrary reference (or randomly) from among a plurality of vehicles 50 equal in power run-out risk.

Referring again to FIG. 7 together with FIGS. 1 to 4, after processing in S12, the process proceeds to S13. In S13, scheduler 304 of server 30 makes a schedule for each DR vehicle selected in S12. When the request contents obtained in S11 indicate a request for promotion of external charging, scheduler 304 makes a charging schedule indicating time to start and quit external charging. When the request contents obtained in S11 indicate a request for suppression of external charging, scheduler 304 makes a charging suppression schedule indicating time to start and quit charging restriction. When the request contents obtained in S11 indicate a request for carrying out external power feed, scheduler 304 makes a power feed schedule indicating time to start and quit external power feed. Scheduler 304 makes a schedule for each DR vehicle based on the request contents obtained in S11 and the power run-out information (FIG. 4) in storage 32.

Making of a schedule for vehicles 50A to 50C shown in FIG. 3 will be described below with reference to FIGS. 9 to 11. Vehicles 50A to 50C are higher in power run-out risk in the order of vehicle 50B, vehicle 50C, and vehicle 50A.

Figure 9:
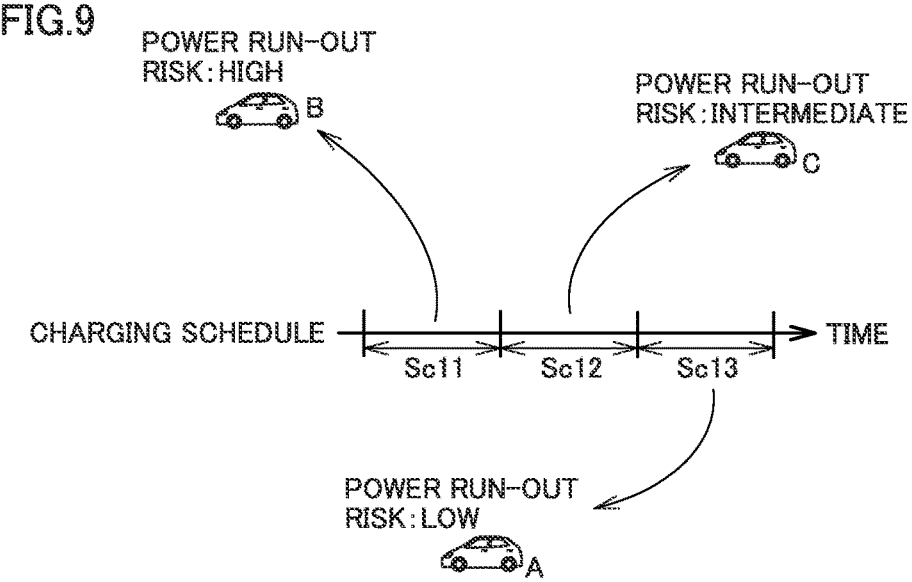
FIG. 9 is a diagram for illustrating making of a charging schedule in the processing shown in FIG. 7.

FIG. 9 is a diagram for illustrating making of a charging schedule. Referring to FIG. 9 together with FIGS. 1 to 4, scheduler 304 makes a charging schedule such that a request is started earlier in a DR vehicle higher in power run-out risk among DR vehicles selected in S12. For example, when vehicles 50A to 50C are selected in S12, scheduler 304 makes charging schedules Sc11 to Sc13 for vehicles 50A to 50C such that a request is started in the order of charging schedule Sc11 for vehicle 50B (high in power run-out risk), charging schedule Sc12 for vehicle 50C (intermediate in power un-out risk), and charging schedule Sc13 for vehicle 50A (low in power run-out risk). By carrying out external charging early based on the request, vehicle 50B high in power run-out risk can thus be lowered in power run-out risk early. Excessively high power run-out risk of each DR vehicle is thus suppressed.

Figure 10:
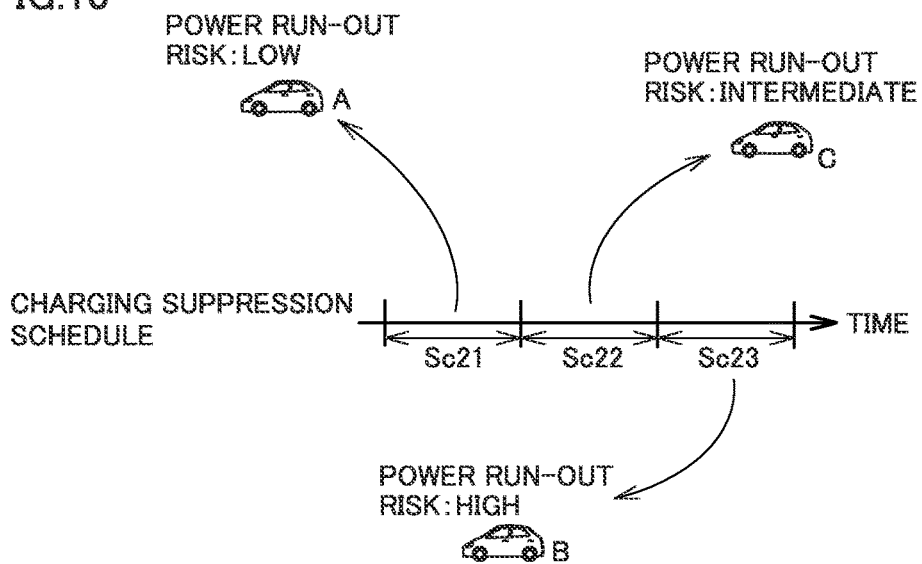
FIG. 10 is a diagram for illustrating making of a charging suppression schedule in the processing shown in FIG. 7.

FIG. 10 is a diagram for illustrating making of a charging suppression schedule. Referring to FIG. 10 together with FIGS. 1 to 4, scheduler 304 makes a charging suppression schedule such that a request is started earlier in a DR vehicle lower in power run-out risk among DR vehicles selected in S12. For example, when vehicles 50A to 50C are selected in S12, scheduler 304 makes charging suppression schedules Sc21 to Sc23 for vehicles 50A to 50C such that the request is started in the order of charging suppression schedule Sc21 for vehicle 50A (low in power run-out risk), charging suppression schedule Sc22 for vehicle 50C (intermediate in power run-out risk), and charging suppression schedule Sc23 for vehicle 50B (high in power run-out risk). Vehicle 50B high in power run-out risk can thus be lowered in power run out risk during a DR grace period (a period by the time of start of the request). Examples of a method of lowering power ran-out risk during the DR grace period include charging battery 130 with a power supply (for example, a spare power storage) other than power grid PG, refueling the PHV, and changing a next travel schedule. The charging suppression schedule made as above suppresses excessively high power run-out risk of each DR vehicle.

Figure 11:
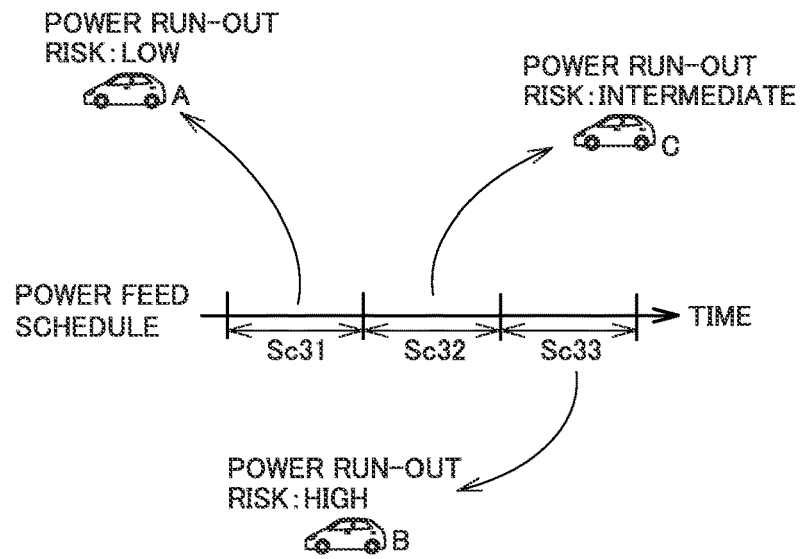
FIG. 11 is a diagram for illustrating making of a power feed schedule in the processing shown in FIG. 7.

FIG. 11 is a diagram for illustrating making of a power feed schedule. Referring to FIG. 11 together with FIGS. 1 to 4, scheduler 304 makes a power feed schedule such that a request is started earlier in a DR vehicle lower in power run-out risk among DR vehicles selected in S12. For example, when vehicles 50A to 50C are selected in S12, scheduler 304 makes power feed schedules Sc31 to Sc33 for vehicles 50A to 50C such that the request is started in the order of power feed schedule Sc31 for vehicle 50A (low in power run-out risk), power feed schedule Sc32 for vehicle 50C (intermediate in power run-out risk), and power feed schedule Sc33 for vehicle 50B (high in power run-out risk). Vehicle 50B high in power run-out risk can thus be lowered in power run-out risk during the DR grace period. Excessively high power run-out risk of each DR vehicle is thus suppressed.

Referring again to FIG. 7 together with FIGS. 1 to 4, in S14, controller 31 controls communication apparatus 33 to transmit the schedule made in S13 to the user of each DR vehicle and to request the user to give an answer as to whether or not the user approves the schedule. The schedule may be transmitted to communication equipment 180 (FIG. 1) mounted on the DR vehicle or to portable terminal 80 (FIG. 2) carried by the user of the DR vehicle.

In S15, controller 31 determines whether or not all users to which the schedule had been sent have given answers indicating approval of the schedule. This determination is made, for example, at timing of reception of answers from all users to which the schedule had been transmitted or timing of lapse of a prescribed time period since transmission of the schedule. In this embodiment, a user who has not yet transmitted the answer even after lapse of the prescribed time period since transmission of the schedule is handled similarly to a user who has given an answer to the effect that the user does not approve the schedule.

When determination as NO is made in S15 (at least one user has not approved the schedule), in S16, controller 31 excludes a vehicle belonging to the user who has not approved the schedule from candidates for the DR vehicle. Thereafter, the process returns to S12. The vehicle excluded in S16 is not selected in S12. While determination as NO is made in S15, S12 to S16 are repeatedly performed.

When determination as YES is made in S15 (all users have approved the schedule), in S17, controller 31 notifies the aggregator of completion of preparation for electric power trading through a not-shown notification apparatus (for example, a touch panel display). Approval of the schedule by the user of each DR vehicle means that the user of each DR vehicle and the aggregator have reached a provisional agreement. The provisional agreement is a promise to the user of the DR vehicle by the aggregator, of payment of the incentive to the user who meets the request from the aggregator.

As DSR (the DR vehicle) for regulation of electric power is secured as above, the aggregator can trade electric power in the power market, for example, through Japan Electric Power Exchange (JEPX). The aggregator may also make a bid. When trading ends, the aggregator inputs a result (done/not done) of trading into server 30.

After controller 31 of server 30 performs notification processing in S17, in S18, it waits for input from the aggregator. Then, when the result (done/not done) of trading is input from the aggregator (YES in S18), in S19, controller 31 determines whether or not trading of electric power was done.

When trading of electric power was done (YES in S19), in S191, request processor 305 of server 30 transmits a DR signal described previously to the user of each DR vehicle. As the user of each DR vehicle receives the DR signal, a formal agreement is concluded between the user of each DR vehicle and the aggregator. The formal agreement is a promise by the user of each DR vehicle to the aggregator that the user has each DR vehicle stand by such that server 30 can remotely control external charging and external power feed of each DR vehicle during the DR period indicated in the schedule in each DR signal. Conclusion of the formal agreement finalizes the promise in the provisional agreement described previously. The user who has received the DR signal can receive the incentive from the aggregator by having the DR vehicle stand by as above. On the other hand, a penalty is imposed on a user who has broken the promise. When trading of electric power was not done (NO in S19), in S192, request processor 305 of server 30 notifies the user of each DR vehicle that trading was not done. The provisional agreement described previously is withdrawn by this notification.

Figure 12:
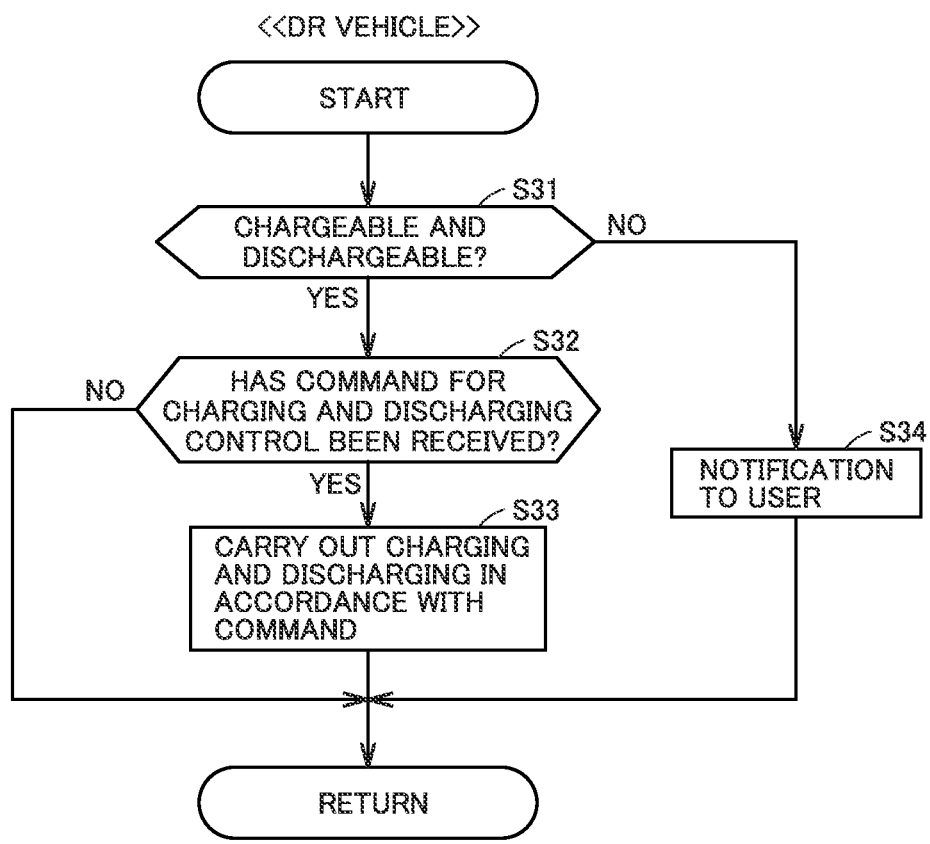
FIG. 12 is a flowchart showing charging and discharging control of a power storage of a DR vehicle in the power management system according to the embodiment of the present disclosure.

FIG. 12 is a flowchart showing charging and discharging control of battery 130 in vehicle 50 finalized as the DR vehicle. Processing shown in this flowchart is repeatedly performed by ECU 150 during the DR period indicated in the schedule included in the DR signal. When, the user receives the DR signal, vehicle 50 belonging to that user is finalized as the DR vehicle, and when the DR period elapses, the DR vehicle returns to a non-DR vehicle (that is, vehicle 50 which is not the DR vehicle).

Referring to FIG. 12 together with FIGS. 1 to 5, in S31, charging and discharging controller 502 (FIG. 4) of ECU 150 determines whether or not battery 130 is in a chargeable and dischargeable state based on outputs from various sensors. For example, charging and discharging controller 502 checks a state of connection of charging cable 42, and when electrical connection between the DR vehicle and EVSE 40 is insufficient, the charging and discharging controller determines that battery 130 is not in the chargeable and dischargeable state. When an abnormal condition (for example, communication abnormality or circuit abnormality) occurs in at least one of the DR vehicle and EVSE 40 as well, the charging and discharging controller determines that battery 130 is not in the chargeable and dischargeable state.

When battery 130 is in the chargeable and dischargeable state (YES in S31), in S32, ECU 150 determines whether or not it has received a command for charging and discharging control from server 30. When the ECU has received the command from server 30 (YES in S32), in S33, charging and discharging controller 502 carries out charging and discharging control of battery 130 in accordance with the command. While ECU 150 continues to receive the command from server 30, processing in S31 to S33 is repeated. Server 30 transmits a command to each DR vehicle in accordance with the schedule included in each DR signal. Therefore, control of charging and discharging controller 502 of each DR vehicle in accordance with the command from server 30 means that any of promotion of external charging, suppression of external charging, and external power feed is earned out in accordance with the schedule included in each DR signal.

During a period other than the DR period, ECU 150 carries out immediate charging and timer-programmed charging based on an instruction from a user (for example, a prescribed operation). Immediate charging refers to external charging started immediately after completion of preparation for external charging in vehicle 50. Timer-programmed charging refers to external charging carried out in accordance with a schedule programmed in ECU 150. During the DR period, however, ECU 150 carries out charging and discharging control of battery 130 with priority being placed on a command from server 30 over the timer-programmed schedule of charging. When ECU 150 receives a charging start command from server 30 before time to start timer-programmed charging, it starts charging of battery 130 in accordance with the command from server 30.

For a period during which ECU 150 does not receive the command from server 30 (NO in S32), ECU 150 waits for a command from server 30 while it repeats processing in S31 and S32.

When determination as NO is made in S31 (battery 130 is not in the chargeable and dischargeable state), the process proceeds to S34. In S34, ECU 150 controls notification apparatus 170 (FIG. 1) to notify the user of the DR vehicle that battery 130 is not in the chargeable and dischargeable state. This notification may be given by portable terminal 80. Determination as NO in S31 means that server 30 is unable to control external charging and external power feed of the DR vehicle by remote control (and a penalty is imposed on the user).

Figure 13:
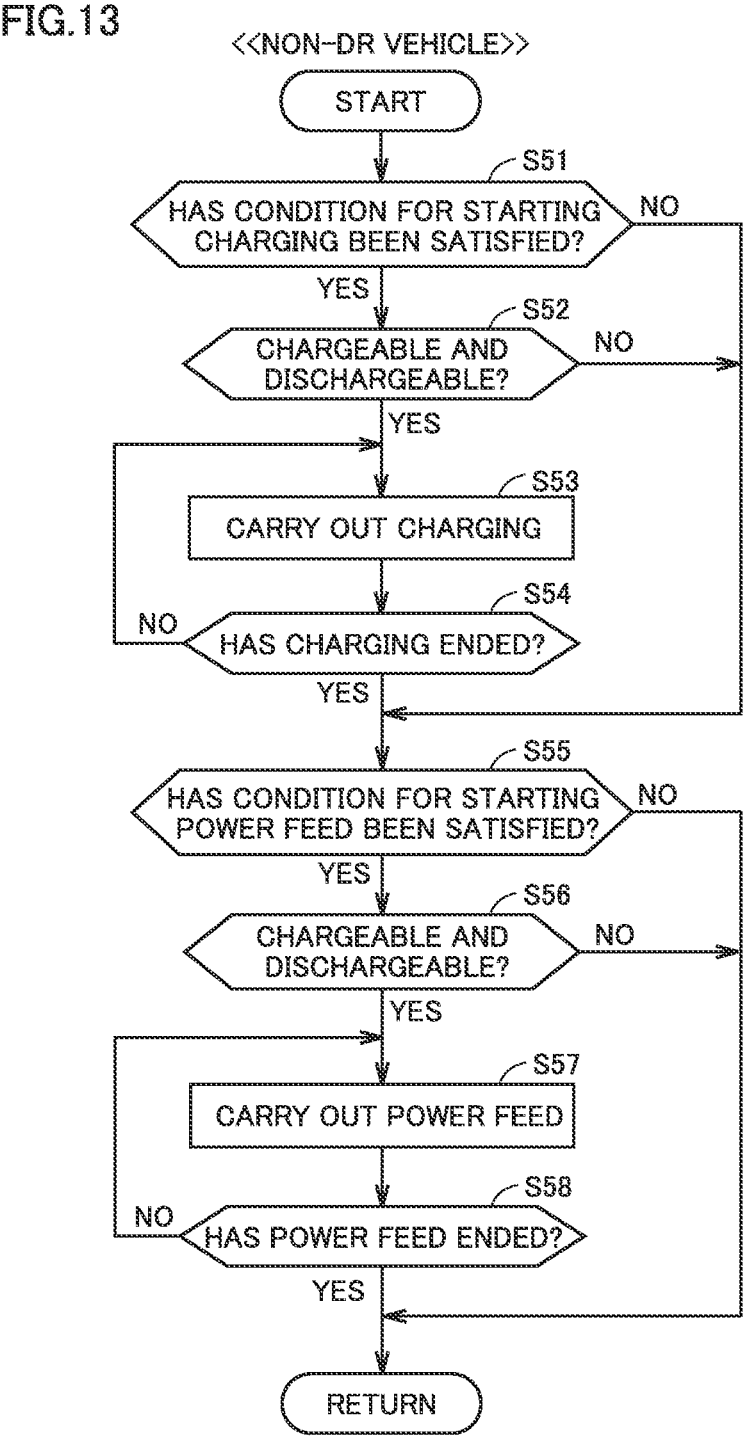
FIG. 13 is a flowchart showing charging and discharging control of a power storage of a non-DR vehicle in the power management system according to the embodiment of the present disclosure.

FIG. 13 is a flowchart showing charging and discharging control of battery 130 of a non-DR vehicle. Processing shown in this flowchart is repeatedly performed while the non-DR vehicle is parked.

Referring to FIG. 13 together with FIGS. 1 to 5, in S51, whether or not a condition for starting external charging has been satisfied is determined. In this embodiment, when time to start charging that has been timer-programmed in ECU 150 comes, the condition for starting external charging is satisfied. When charging has not been timer-programmed in ECU 150, connection of connector 43 of charging cable 42 connected to EVSE 40 to inlet 110 of vehicle 50 (see FIG. 1) satisfies the condition for starting immediate charging. When a prescribed operation to start charging by the user onto EVSE 40 or vehicle 50 is performed as well, the condition for starting external charging is satisfied. Any operation to start charging can be set. The operation to start charging may be, for example, an operation to press a prescribed button by the user.

Though not shown in FIG. 13, when the condition for starting external charging is satisfied (YES in S51), a start signal is input to ECU 150 and ECU 150 is started up. Started-up ECU 150 performs processing in S52. In S52, ECU 150 determines whether or not battery 130 is in the chargeable and dischargeable state. Processing in S52 is the same, for example, as S31 in FIG. 12.

When battery 130 is in the chargeable and dischargeable state (YES in S52), in S53, charging and discharging controller 502 controls charger-discharger 120 to carry out external charging. Thereafter, in S54, charging and discharging controller 502 determines whether or not a condition for quitting external charging has been satisfied. While determination as NO is made in S54, external charging (S53) is continued. Any condition for quitting external charging can be set. The condition for quitting external charging may be satisfied when the SOC of battery 130 is equal to or larger than a prescribed SOC value during external charging or when a user gives an instruction to stop charging during external charging. When the condition for quitting external charging has been satisfied (YES in S54), the vehicle system (and ECU 150) enters a stop state (for example, a sleep mode) and thereafter the process proceeds to S55. When determination as NO is made in any of S51 and S52 as well the process proceeds to S55.

In S55, whether or not the condition for starting external power feed has been satisfied is determined. In this embodiment, when a user performs a prescribed operation to start power feed onto EVSE 40 or vehicle 50, the condition for starting external power feed is satisfied. Any operation to start power feed can be set. The operation to start power feed may be, for example, an operation to press a prescribed button by the user.

Though not shown in FIG. 13, when the condition for starting external power feed is satisfied (YES in S55), a start signal is input to ECU 150 and ECU 150 is started up. Then, started-up ECU 150 performs processing in S56. In S56, ECU 150 determines whether or not battery 130 is in the chargeable and dischargeable state. Processing in S56 is the same, for example, as S31 in FIG. 12.

When battery 130 is in the chargeable and dischargeable state (YES in S56), in S57, charging and discharging controller 502 controls charger-discharger 120 to carry out external power feed. Thereafter, in S58, charging and discharging controller 502 determines whether or not a condition for quitting external power feed has been satisfied. While determination as NO is made in S58, external power feed (S57) is continued. Any condition for quitting external power feed can be set. The condition for quitting external power feed may be satisfied when the SOC of battery 130 is equal to or smaller than a prescribed SOC value during external power feed. The condition for quitting external power feed may be satisfied when an amount of electric power (that is, an accumulated value of discharging power of battery 130) supplied from vehicle 50 to EVSE 40 in external power feed has exceeded a prescribed value. The condition for quitting external power feed may be satisfied when the user gives an instruction to stop power feed during external power feed. When the condition for quitting external power feed has been satisfied (YES in S58), the vehicle system (and ECU 150) enters the stop state (for example, the sleep mode) and thereafter the process returns to S51. When determination as NO is made in any of S55 and S50 as well, the process returns to S51.

As described above, in the power management system (VGI system 1) according to this embodiment, server 30 obtains power run-out information indicating power run-out risk for each vehicle and makes selection (S12 in FIG. 7) of a DR vehicle and makes a schedule (S13 in FIG. 7) based on the obtained power run-out information. For a request that raises power run-out risk, in selection of a DR vehicle, server 30 makes vehicle 50 high in power run-out risk less likely to be selected. In making a schedule for vehicle 50 high in power run-out risk, server 30 suppresses increase in power run-out risk by adjusting time to start the request. In requesting a user of vehicle 50 including battery 130 to regulate supply and demand of electric power, the power management system can suppress excessively high power run-out risk of vehicle 50 (and compromise of convenience of the user of vehicle 50) caused by regulation of supply and demand of electric power.

Though power run-out information is used for both of selection of a DR vehicle (S12 in FIG. 7) and making of a schedule (S13 in FIG. 7) in the embodiment, the power run-out information may be used for only any one of selection of a DR vehicle and making of a schedule. For example, in selection of a DR vehicle from among vehicles 50 electrically connected to power grid PG at the current time point for requesting the DR vehicle to participate in DR that is immediately carried out, server 30 may select a DR vehicle based on the power run-out information. When vehicle 50 is newly electrically connected to power grid PG after DR is started, server 30 may add newly connected vehicle 50 to candidates for the DR vehicle and select again the DR vehicle based on power run-out information.

Figure 14:
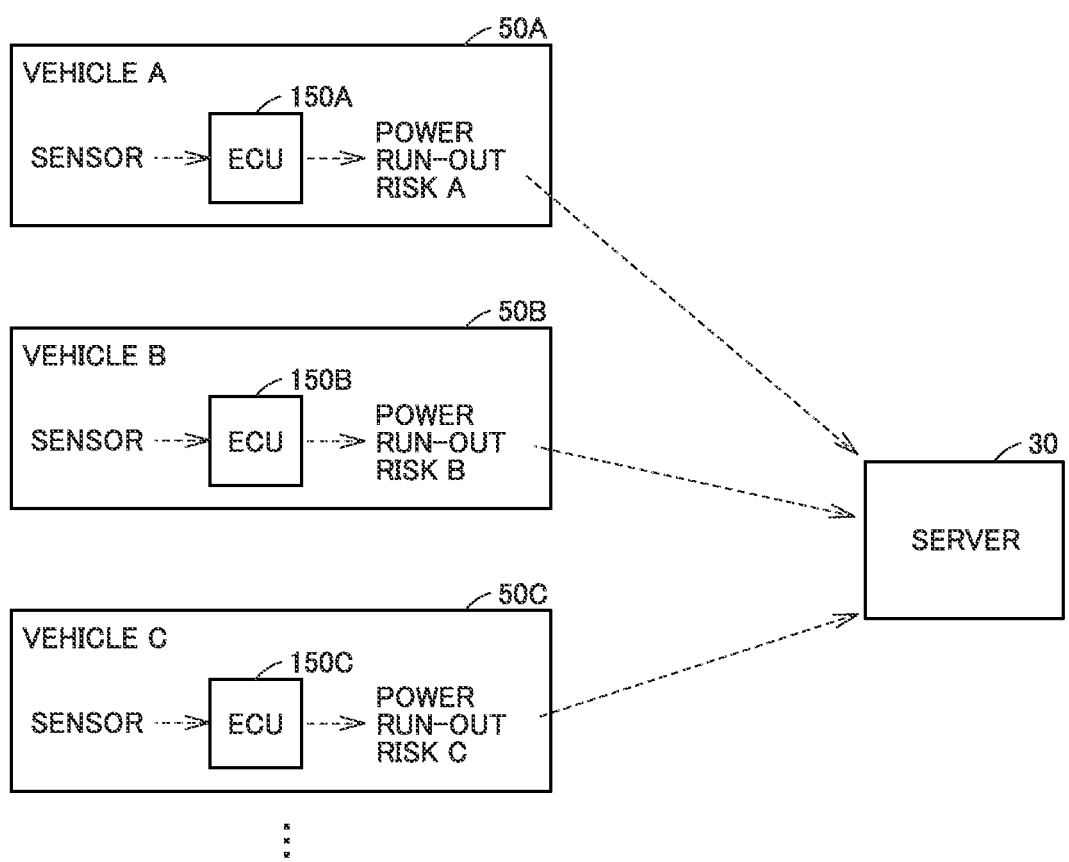
FIG. 14 is a diagram showing a plurality of vehicles each incorporating an estimator in a modification.

In the embodiment, the estimator (estimator 302) that estimates power run-out risk of vehicle 50 is mounted on server 30. Without being limited as such, each vehicle 50 may include an estimator and the estimator may estimate power run-out risk of vehicle 50 FIG. 14 is a diagram showing a plurality of vehicles 50 each incorporating an estimator. In FIG. 14, each of ECUs 150A to 150C functions as the estimator. Each of ECUs 150A to 150C corresponds to an exemplary "second estimator" according to the present disclosure.

Referring to FIG. 14, vehicles 50A to 50C shown in FIG. 3 include ECUs 150A to 150C, respectively. ECUs 150A to 150C estimate power run-out risks A to C of vehicles 50A to 50C, respectively. The method of estimating power run-out risk is the same as in the embodiment described previously (see FIGS. 5 and 6). Vehicles 50A to 50C transmit power run-out risks estimated by ECUs 150A to 150C to server 30. Server 30 can obtain power run-out risk for each vehicle from each vehicle 50. Information thus transmitted from each vehicle 50 to server 30 corresponds to power run-out information. Server 30 can carry out at least one of selection of a DR vehicle (S12 in FIG. 7) and making of a schedule (S13 in FIG. 7) based on power run-out information.

Figure 15:
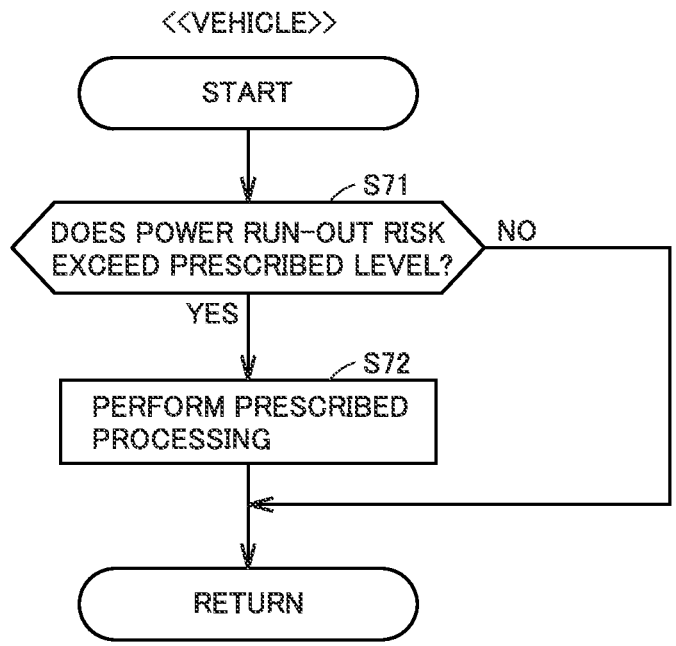
FIG. 15 is a flowchart showing vehicle control based on power run-out risk in a modification.

Each of vehicles 50A to 50C shown in FIG. 14 may use power run-out risk estimated as above for vehicle control. FIG. 15 is a flowchart showing exemplary vehicle control based on power run-out risk. Processing shown in this flowchart is repeatedly performed in each vehicle 50 including the estimator.

Referring to FIG. 15 together with FIGS. 1 and 2, in S71, ECU 150 determines whether or not estimated power run-out risk exceeds a prescribed level. While determination as NO is made in S71 (power run-out risk does not exceed the prescribed level), ECU 150 repeatedly makes determination, and when determination as YES is made in S71 (power run-out risk exceeds the prescribed level), the ECU performs prescribed processing in S72. In S72, ECU 150 may notify a user of high power run-out risk. ECU 150 may instruct any of notification apparatus 170 and portable terminal 80 to give a notification. In S72, ECU 150 may control storage 153 to record high power run-out risk together with current time. In S72, ECU 150 may restrict a travel mode of vehicle 50 to a mode in which electric power consumption is prioritized over travel power.

In the embodiment, server 30 remotely controls vehicle 50 to control external charging and external power feed in accordance with a schedule. Remote control of vehicle 50 by server 30, however, is not essential. ECU 150 mounted on vehicle 50 may control external charging and external power feed in accordance with the schedule (a request from request processor 305).

It is not essential that the inlet and the charger-discharger adapted to the DC type EVSE are optional charging equipment for vehicle 50. The power management system may include a vehicle including a DC type charger but not including an AC type charger. Though the DC type charger is generally higher in charging power than the AC type charger, the DC type EVSE is less prevalent than the AC type EVSE. Server 30 may evaluate power run-out risk of each vehicle in consideration of a status of infrastructures for charging (for example, a rate of penetration of the DC type EVSE).

The power management system may include a power facility that carries out only power feed with electric power supplied from power grid PG or a power facility that carries out only backfeeding to power grid PG. The power management system may include a vehicle capable only of external charging or a vehicle capable only of external power feed.

The power management system is not limited to VGI system 1 shown in FIGS. 2 and 3. The electric power utility company may be divided for each business sector. A power generation utility and a power transmission and distribution utility may belong to companies different from each other. In the embodiment, for electric power regulation requested in the power market, server 30 selects a DR vehicle, makes a schedule, and issues a request to the DR vehicle (see FIG. 7). Without being limited as such, for electric power regulation requested by an electric power utility company, server 30 may select a DR vehicle, make a schedule, and issue a request for the DR vehicle. The server that selects a DR vehicle, makes a schedule, and issues a request to the DR vehicle is not limited to an aggregator server and any server dial manages a vehicle is applicable.

A configuration of the vehicle is not limited to the configuration shown in FIG. 1. For example, in the configuration shown in FIG. 1, a charging apparatus capable only of external charging or a power feed apparatus capable only of external power feed may be adopted instead of charger-discharger 120. The vehicle may be capable of wireless charging. The vehicle is not limited to a passenger vehicle but may be a bus or a truck.

The power management system described above may be applied to a mobile body other than the vehicle. The mobile body may be transportation means (a ship or an airplane) other than the vehicle or an unmanned mobile body (an automated guided vehicle (AGV), an agricultural implement, a movable robot, or a drone). The portable terminal may be carried by a manager of a mobile body (for example, a manager of a drone).

Figure 16:
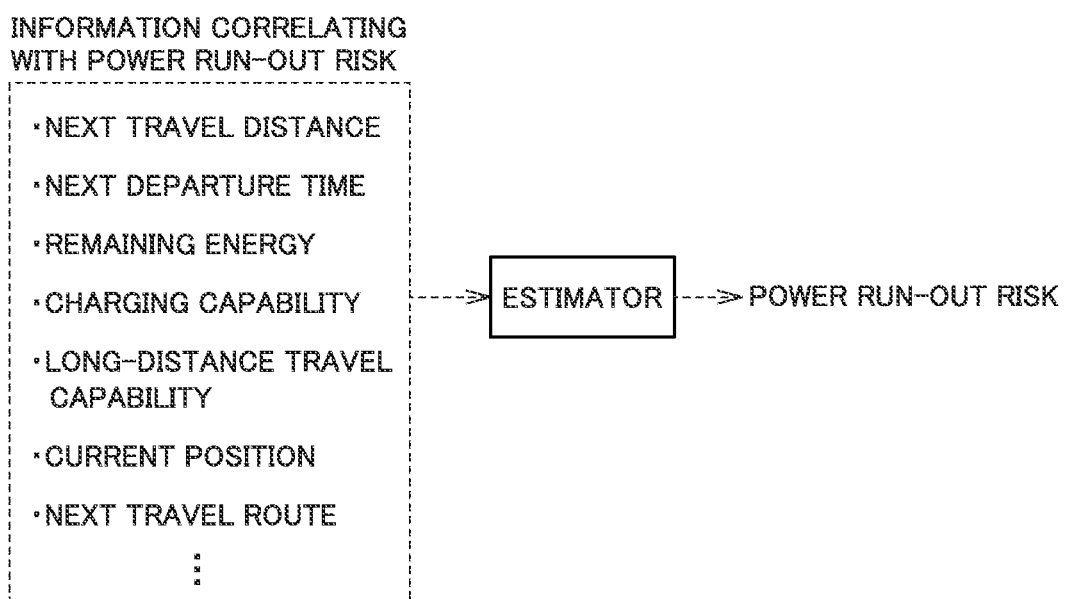
FIG. 16 is a diagram for illustrating a modification of the estimator.

The estimator adopted in the power management system may estimate power run-out risk of any mobile body. The estimator may be mounted on any of the server, the mobile body, and the portable terminal. FIG. 16 is a diagram for illustrating a modification of the estimator.

Referring to FIG. 16, the estimator may estimate power run-out risk of a mobile body based on a next travel distance, next departure time, remaining energy for traveling, charging capability, long-distance travel capability, a current position, and a next travel route of the mobile body. Y1 described previously corresponds to an exemplary "next travel distance." Y2 described previously corresponds to exemplary "next departure time." Y3 described previously corresponds to exemplary "remaining energy for traveling." Y4 and Y6 described previously correspond to exemplary "charging capability." Y5 and Y7 described previously correspond to exemplary "long-distance travel capability." Since the next travel distance, next departure time, remaining energy for traveling, charging capability, and long-distance travel capability are adopted in the embodiment described previously, description will not be provided.

The estimator may estimate power run-out risk of the mobile body based on a current position and a next travel route of the mobile body. The estimator can obtain a current position of the mobile body, for example, with a sensor based on the GPS. A user may set the next travel route, for example, with a well-known navigation system. The estimator may obtain the next travel route from the navigation system. The estimator may estimate power run-out risk of a mobile body as being higher as there are fewer charging facilities available for the mobile body in an area around the mobile body. The estimator may estimate power run-out risk of the mobile body in consideration of a direction of wind, a gradient of a road, a state of a road surface, and congestion over the next travel route.

Though the estimator may estimate power run-out risk based on only one of a next travel distance, next departure time, remaining energy for traveling, charging capability, long-distance travel capability, a current position, and a next travel route of the mobile body, the estimator more readily estimates power run-out risk at high accuracy based on three or more of them. In particular, the estimator more readily estimates power run-out risk at high accuracy based on next departure time, remaining energy for traveling, and long-distance travel capability.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A server comprising a processor circuit and a memory, said server usable in a power management system including a plurality of power storages, each of the plurality of power storages carrying out at least one of external charging and external power feed, the external charging being charging of the power storage with electric power supplied from outside, the external power feed being supply of electric power from the power storage to outside, the server configured to:
   select at least one of the plurality of power storages;
   make a schedule for the selected power storage;
   request a user of the selected power storage to promote the external charging, suppress the external charging, or carry out the external power feed in accordance with the made schedule;
   obtain power run-out information that indicates power run-out risk for each power storage;
   carry out at least one of selection of the power storage and making of the schedule in accordance with a type of a request based on the obtained power run-out information;
   make a charging schedule such that the request is started earlier in a DR (demand response) vehicle higher in power run-out risk among selected DR vehicles;
   make a charging suppression schedule such that the request is started earlier in a DR vehicle lower in power run-out risk among selected DR vehicles;
   make a power feed schedule such that the request is started earlier in a DR vehicle lower in power run-out risk among selected DR vehicles;
   transmit the schedule for the DR vehicle to a user of the DR vehicle to request the user to give an answer as to whether or not the user approves the schedule;
   determine whether or not trading of electric power was done after all users have approved the schedule by the answer; and
   transmit a DR signal to each user that has approved the schedule when it is determined that the trading of electric power was done, the DR signal requesting the user of the DR vehicle to promote the external charging, suppress the external charging, or carry out the external power feed in accordance with the schedule.

2. The server of claim 1 further configured to select a power storage requested to suppress the external charging or carry out the external power feed and preferentially sequentially select the power storage lower in power run-out risk.

3. The server of claim 1 further configured to make a schedule for issuing a request for suppressing the external charging or carrying out the external power feed, such that a power storage lower in power run-out risk among the selected power storages starts earlier the request for suppressing the external charging or carrying out the external power feed.

4. The server of claim 1 further configured to:
   select a power storage requested to promote the external charging; and preferentially sequentially select the power storage higher in power run-out risk.

5. The server of claim 1 further configured to make a schedule for issuing a request for promoting the external charging such that a power storage higher in power run-out risk among the selected power storages starts earlier the request for promoting the external charging.

6. The server of claim 1, wherein
   the plurality of power storages are mounted on a plurality of mobile bodies, respectively, and wherein
   the server is further configured to estimate the power run-out risk for each mobile body based on at least one of long-distance travel capability, charging capability, a current position, a next travel distance, next departure time, a next travel route, and remaining energy for traveling for each mobile body.

7. A power management system comprising:
   the server of claim 1; and
   a plurality of mobile bodies,
   the plurality of power storages being mounted on the plurality of mobile bodies, respectively, wherein
   each of the plurality of mobile bodies being configured to estimate the power run-out risk of each of the plurality of mobile bodies based on at least one of long-distance travel capability, charging capability, a current position, a next travel distance, next departure time, a next travel route, and remaining energy for traveling of the mobile body, and
   transmit the power run-out risk of the mobile body to the server.

8. A power management system comprising:
   the server of claim 1;
   a plurality of vehicles, the plurality of power storages being mounted on the plurality of vehicles, respectively;
   a plurality of power facilities electrically connectable to the plurality of vehicles, respectively; and
   a power grid that supplies electric power to each of the plurality of power facilities, wherein
   the server transmits a signal to at least one of communication equipment mounted on the vehicle and a portable terminal carried by a user of the vehicle, the signal requesting the user of the vehicle to promote the external charging, suppress the external charging, or carry out the external power feed in accordance with the schedule.

9. The server according to claim 1, wherein
   the plurality of power storages are mounted on a plurality of vehicles, respectively, and
   the server comprises a first estimator that estimates the power run-out risk for each vehicle based on data indicating long-distance travel capability, charging-capability, a next travel distance, next departure time, and remaining energy for traveling for each vehicle.

10. The server according to claim 9, wherein
    the plurality of vehicles include an electric vehicle that can travel with electric power stored in the power storage and a plug-in hybrid vehicle that can travel with both of electric power stored in the power storage and engine output,
the server configured to:
receive spec information for the vehicle from each vehicle, the spec information indicating whether the vehicle falls under the electric vehicle or the plug-in hybrid vehicle,
determine that the plug-in hybrid vehicle is higher in the long-distance travel capability than the electric vehicle,
estimate the long-distance travel capability is higher as being lower in the power run-out risk,
receive information representing a state of the vehicle from each vehicle,
determine that an amount of stored power in the power storage of the electric vehicle corresponds to the remaining energy for traveling of the electric vehicle,
determine that a value of the sum of an amount of stored power in the power storage and an amount of fuel in a fuel tank of the engine of the plug-in hybrid vehicle as being converted to travel driving energy corresponds to the remaining energy for traveling of the plugin hybrid vehicle, and
estimate the remaining energy for traveling is higher as being lower in the power run-out risk.

11. The server according to claim 9, further configured to:
receive spec information for the vehicle from each vehicle, the spec information indicating maximum charging power of the power storage mounted on the vehicle,
determine the maximum charging power is higher as being higher in the charging capability, and
estimate the charging capability is higher as being lower in the power run-out risk.

12. The server according to claim 9, further configured to:
receive information representing a schedule of a user of the vehicle from a portable terminal carried by the user of each vehicle, the schedule of the user including a drive plan of the vehicle,
obtain the data indicating the next travel distance and the next departure time based on the information received from the portable terminal,
estimate the next travel distance is longer as being higher in the power run-out risk, and
estimate the next departure time is earlier as being higher in the power run-out risk.

13. The server according to claim 9, further configured to:
estimate a degree of deterioration of the power storage mounted on each vehicle,
determine the degree of deterioration of the power storage is higher as being lower in the long-distance travel capability, and
estimate the long-distance travel capability is higher as being lower in the power run-out risk.

14. The server according to claim 9, further configured to:
receive spec information for the vehicle from each vehicle, the spec information indicating whether or not optional charging equipment is mounted on the vehicle,
determine that the vehicle with the optional charging equipment is higher in the charging capability than the vehicle without the optional charging equipment, and
estimate the charging capability is higher as being lower in the power run-out risk.

15. The server according to claim 9, wherein
the first estimator is configured to estimate the power run-out risk for each vehicle based on a radar chart at which the data is plotted.

16. The server according to claim 9, wherein
the first estimator is configured to calculate the power run-out risk for each vehicle based on the data by using a mathematical expression obtained by statistical learning with big data.

17. A power management system comprising:
the server of claim 1, and
a plurality of vehicles, wherein
the server is configured to transmit a command to each DR vehicle in accordance with the DR signal,
the plurality of vehicles are each configured to carry out immediate charging and timer-programmed charging based on an instruction from a user during a period other than the schedule indicated by the DR signal, and
carry out charging and discharging control of the power storage in accordance with the command from the server during a period of the schedule indicated by the DR signal.

18. A server comprising a processor and a memory, said server usable in a power management system including a plurality of power storages, each of the plurality of power storages carrying out at least one of external charging and external power feed, the external charging being charging of the power storage with electric power supplied from outside, the external power feed being supply of electric power from the power storage to outside, the plurality of power storages being mounted on a plurality of mobile bodies, respectively, the server configured to:
select at least one of the plurality of power storages;
make a schedule for the selected power storage;
request a user of the selected power storage to promote the external charging, suppress the external charging, or carry out the external power feed in accordance with the made schedule;
obtain information on at least one of long-distance travel capability, charging capability, a current position, a next travel distance, next departure time, a next travel route, and remaining energy for traveling for each mobile body;
carry out at least one of selection of the power storage and making of the schedule in accordance with a type of a request based on the obtained information;
make a charging schedule such that the request is started earlier in a DR (demand response) vehicle higher in power run-out risk among selected DR vehicles;
make a charging suppression schedule such that the request is started earlier in a DR vehicle lower in power run-out risk among selected DR vehicles;
make a power feed schedule such that the request is started earlier in a DR vehicle lower in power run-out risk among selected DR vehicles;
transmit the schedule for the DR vehicle to a user of the DR vehicle to request the user to give an answer as to whether or not the user approves the schedule;
determine whether or not trading of electric power was done after all users have approved the schedule by the answer; and
transmit a DR signal to each user that has approved the schedule when it is determined that the trading of electric power was done, the DR signal requesting the user of the DR vehicle to promote the external charging, suppress the external charging, or carry out the external power feed in accordance with the schedule.

\* \* \* \* \*